(12) United States Patent
Gottfurcht et al.

(10) Patent No.: US 7,441,196 B2
(45) Date of Patent: *Oct. 21, 2008

(54) APPARATUS AND METHOD OF MANIPULATING A REGION ON A WIRELESS DEVICE SCREEN FOR VIEWING, ZOOMING AND SCROLLING INTERNET CONTENT

(75) Inventors: Elliot A. Gottfurcht, Pacific Palisades, CA (US); Grant E. Gottfurcht, Pacific Palisades, CA (US); Albert-Michel C. Long, Irvine, CA (US)

(73) Assignees: Elliot Gottfurcht, Pacific Palisades, CA (US); Marlo Longstreet 2003 Irrevocable Trust, Pacific Palisades, CA (US); Grant Gottfurcht 2003 Irrevocable Trust, Pacific Palisades, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/373,324

(22) Filed: Mar. 13, 2006

(65) Prior Publication Data

US 2006/0212811 A1    Sep. 21, 2006

Related U.S. Application Data

(63) Continuation of application No. 09/518,015, filed on Mar. 3, 2000, now Pat. No. 7,020,845, which is a continuation-in-part of application No. 09/440,214, filed on Nov. 15, 1999, now Pat. No. 6,600,497.

(51) Int. Cl.
    *G06F 3/00*    (2006.01)
(52) U.S. Cl. .................. 715/740; 715/730; 715/760

(58) Field of Classification Search .................. 715/700, 715/733–740, 760
See application file for complete search history.

(56) References Cited

U.S. PATENT DOCUMENTS

| | | | |
|---|---|---|---|
| 3,586,771 | A | 6/1971 | Hamburger |
| 4,650,977 | A | 3/1987 | Couch |
| 4,706,121 | A | 11/1987 | Young |
| 4,992,940 | A | 2/1991 | Dworkin |

(Continued)

FOREIGN PATENT DOCUMENTS

CA    2001263    4/1990

(Continued)

OTHER PUBLICATIONS

Chieko Asakawa, "User Interface of a Home Page Reader," Apr. 15, 1998, 8 pages, Assets '98, Marina del Rey, California.

(Continued)

*Primary Examiner*—Simon Ke
(74) *Attorney, Agent, or Firm*—SoCal IP Law Group LLP; Steven C. Sereboff; John E. Gunther

(57) ABSTRACT

A method and apparatus of simplified navigation. A web page is provided having a link to a sister site. The sister site facilitates simplified navigation. Pages from the sister site are served responsive to actuation of the sister site link. In one embodiment, the sister site includes matrix pages to permit matrix navigation.

76 Claims, 28 Drawing Sheets

U.S. PATENT DOCUMENTS

| | | |
|---|---|---|
| 5,041,312 A | 8/1991 | Swartz |
| 5,064,999 A | 11/1991 | Okamoto et al. |
| 5,119,188 A | 6/1992 | McCalley et al. |
| 5,236,199 A | 8/1993 | Thompson |
| 5,321,749 A | 6/1994 | Virga |
| 5,353,016 A | 10/1994 | Kurita et al. |
| 5,410,326 A | 4/1995 | Goldstein |
| 5,479,268 A | 12/1995 | Young et al. |
| 5,532,735 A | 7/1996 | Blahut et al. |
| 5,553,242 A | 9/1996 | Russell et al. |
| 5,559,548 A | 9/1996 | Davis et al. |
| 5,598,523 A | 1/1997 | Fujita |
| 5,602,596 A | 2/1997 | Claussen et al. |
| 5,617,570 A | 4/1997 | Russell et al. |
| 5,625,781 A | 4/1997 | Cline et al. |
| 5,710,887 A | 1/1998 | Chelliah et al. |
| 5,727,129 A | 3/1998 | Barrett et al. |
| 5,734,719 A | 3/1998 | Tsevdos et al. |
| 5,758,126 A | 5/1998 | Daniels et al. |
| 5,794,210 A | 8/1998 | Goldhaber et al. |
| 5,796,252 A | 8/1998 | Kleinberg et al. |
| 5,801,702 A | 9/1998 | Dolan et al. |
| 5,809,204 A | 9/1998 | Young et al. |
| 5,819,220 A | 10/1998 | Sarukkai et al. |
| 5,822,014 A | 10/1998 | Steyer et al. |
| 5,828,839 A | 10/1998 | Moncreiff |
| 5,832,208 A | 11/1998 | Chen et al. |
| 5,832,459 A | 11/1998 | Cameron et al. |
| 5,838,314 A | 11/1998 | Neel et al. |
| 5,848,396 A | 12/1998 | Gerace |
| 5,851,149 A | 12/1998 | Xidos et al. |
| 5,874,906 A | 2/1999 | Willner et al. |
| 5,878,222 A | 3/1999 | Harrison |
| 5,890,175 A | 3/1999 | Wong et al. |
| 5,893,064 A | 4/1999 | Kudirka et al. |
| 5,895,454 A | 4/1999 | Harrington |
| 5,896,133 A | 4/1999 | Lynch et al. |
| 5,900,905 A | 5/1999 | Shoff et al. |
| 5,902,353 A | 5/1999 | Reber et al. |
| 5,903,729 A | 5/1999 | Reber et al. |
| 5,911,145 A * | 6/1999 | Arora et al. .................. 715/514 |
| 5,918,014 A | 6/1999 | Robinson |
| 5,918,213 A | 6/1999 | Bernard et al. |
| 5,925,103 A | 7/1999 | Magallanes et al. |
| 5,931,901 A | 8/1999 | Wolfe et al. |
| 5,935,002 A | 8/1999 | Falciglia |
| 5,946,381 A | 8/1999 | Danne et al. |
| 5,956,681 A | 9/1999 | Yamakita |
| 5,956,693 A | 9/1999 | Geerlings |
| 5,958,012 A | 9/1999 | Battat et al. |
| 5,960,411 A | 9/1999 | Hartman et al. |
| 5,961,593 A | 10/1999 | Gabber et al. |
| 5,978,381 A | 11/1999 | Perlman et al. |
| 5,990,927 A | 11/1999 | Hendricks et al. |
| 6,002,853 A | 12/1999 | de Hond |
| 6,005,562 A | 12/1999 | Shiga et al. |
| 6,005,631 A | 12/1999 | Anderson et al. |
| 6,006,257 A | 12/1999 | Slezak |
| 6,012,049 A | 1/2000 | Kawan |
| 6,014,502 A * | 1/2000 | Moraes .................. 709/219 |
| 6,018,372 A | 1/2000 | Etheredge |
| 6,025,837 A | 2/2000 | Matthews, III et al. |
| 6,028,600 A | 2/2000 | Rosin et al. |
| 6,031,537 A | 2/2000 | Hugh |
| 6,041,312 A | 3/2000 | Bickerton et al. |
| 6,054,989 A | 4/2000 | Robertson et al. |
| 6,072,483 A | 6/2000 | Rosin et al. |
| 6,072,492 A | 6/2000 | Schagen et al. |
| 6,075,575 A | 6/2000 | Schein et al. |
| 6,078,866 A | 6/2000 | Buck et al. |
| 6,091,417 A | 7/2000 | Lefkowitz |
| 6,094,156 A | 7/2000 | Henty |
| 6,101,473 A | 8/2000 | Scott et al. |
| 6,112,186 A | 8/2000 | Bergh et al. |
| 6,129,274 A | 10/2000 | Suzuki |
| 6,138,107 A | 10/2000 | Elgamal |
| 6,142,371 A | 11/2000 | Oneda |
| 6,151,050 A | 11/2000 | Hosono et al. |
| 6,151,059 A | 11/2000 | Schein et al. |
| 6,151,596 A | 11/2000 | Hosomi |
| 6,151,630 A | 11/2000 | Williams |
| 6,154,205 A | 11/2000 | Carroll et al. |
| 6,160,552 A | 12/2000 | Wilsher et al. |
| 6,167,382 A | 12/2000 | Sparks et al. |
| 6,172,677 B1 | 1/2001 | Stautner et al. |
| 6,177,936 B1 | 1/2001 | Cragun |
| 6,193,152 B1 | 2/2001 | Fernando et al. |
| 6,198,481 B1 | 3/2001 | Urano et al. |
| 6,199,050 B1 | 3/2001 | Alaia et al. |
| 6,199,077 B1 | 3/2001 | Inala et al. |
| 6,199,098 B1 | 3/2001 | Jones et al. |
| 6,205,432 B1 | 3/2001 | Gabbard et al. |
| 6,205,582 B1 | 3/2001 | Hoarty |
| 6,211,878 B1 | 4/2001 | Cheng et al. |
| 6,212,265 B1 | 4/2001 | Duphorne |
| 6,223,215 B1 | 4/2001 | Hunt et al. |
| 6,226,623 B1 | 5/2001 | Schein et al. |
| 6,226,642 B1 | 5/2001 | Beranek et al. |
| 6,229,540 B1 | 5/2001 | Tonelli et al. |
| 6,237,030 B1 | 5/2001 | Adams et al. |
| 6,243,093 B1 | 6/2001 | Czerwinski et al. |
| 6,253,189 B1 | 6/2001 | Feezell et al. |
| 6,260,192 B1 | 7/2001 | Rosin et al. |
| 6,266,060 B1 | 7/2001 | Roth |
| 6,269,343 B1 | 7/2001 | Pallakoff |
| 6,269,361 B1 | 7/2001 | Davis et al. |
| 6,269,403 B1 | 7/2001 | Anders |
| 6,271,832 B1 | 8/2001 | Kamaeguchi et al. |
| 6,282,516 B1 | 8/2001 | Giuliani |
| 6,285,357 B1 | 9/2001 | Kushiro et al. |
| 6,285,987 B1 | 9/2001 | Roth et al. |
| 6,286,017 B1 | 9/2001 | Egilsson |
| 6,286,043 B1 | 9/2001 | Cuomo et al. |
| 6,288,716 B1 | 9/2001 | Humpleman et al. |
| 6,292,779 B1 | 9/2001 | Wilson et al. |
| 6,292,782 B1 | 9/2001 | Weideman |
| 6,292,786 B1 | 9/2001 | Deaton et al. |
| 6,292,809 B1 * | 9/2001 | Edelman .................. 715/503 |
| 6,295,057 B1 | 9/2001 | Rosin et al. |
| 6,298,330 B1 | 10/2001 | Gardenswartz et al. |
| 6,300,947 B1 * | 10/2001 | Kanevsky .................. 715/866 |
| 6,301,566 B1 | 10/2001 | Costello |
| 6,312,336 B1 | 11/2001 | Handelman et al. |
| 6,314,406 B1 | 11/2001 | O'Hagan et al. |
| 6,317,706 B1 | 11/2001 | Saib |
| 6,330,005 B1 | 12/2001 | Tonelli et al. |
| 6,330,543 B1 | 12/2001 | Kepecs |
| 6,333,753 B1 | 12/2001 | Hinckley |
| 6,334,108 B1 | 12/2001 | Deaton et al. |
| 6,334,145 B1 | 12/2001 | Adams et al. |
| 6,336,131 B1 | 1/2002 | Wolfe et al. |
| 6,337,715 B1 | 1/2002 | Inagaki et al. |
| 6,345,279 B1 | 2/2002 | Li et al. |
| 6,356,905 B1 | 3/2002 | Gershman et al. |
| 6,381,583 B1 | 4/2002 | Kenney |
| 6,388,714 B1 | 5/2002 | Schein et al. |
| 6,396,531 B1 | 5/2002 | Gerszberg |
| 6,397,387 B1 | 5/2002 | Rosin et al. |
| 6,401,132 B1 | 6/2002 | Bellwood et al. |
| 6,407,779 B1 | 6/2002 | Herz |
| 6,411,307 B1 | 6/2002 | Rosin et al. |
| 6,411,337 B2 | 6/2002 | Cove et al. |
| 6,415,270 B1 | 7/2002 | Rackson et al. |
| 6,417,873 B1 | 7/2002 | Fletcher et al. |

| | | |
|---|---|---|
| 6,418,441 B1 | 7/2002 | Call |
| 6,421,066 B1 | 7/2002 | Sivan |
| 6,421,071 B1 | 7/2002 | Harrison |
| 6,421,724 B1 | 7/2002 | Nickerson et al. |
| 6,438,540 B2 | 8/2002 | Nasr et al. |
| 6,445,398 B1 | 9/2002 | Gerba et al. |
| 6,460,181 B1 | 10/2002 | Donnelly |
| 6,476,825 B1 | 11/2002 | Croy |
| 6,477,575 B1 | 11/2002 | Koeppel et al. |
| 6,484,149 B1 | 11/2002 | Jammes et al. |
| 6,487,189 B1 | 11/2002 | Eldridge et al. |
| 6,487,586 B2 | 11/2002 | Ogilvie et al. |
| 6,490,555 B1 | 12/2002 | Yegnanarayanan et al. |
| 6,509,913 B2 | 1/2003 | Martin, Jr. et al. |
| 6,516,311 B1 | 2/2003 | Yacoby |
| 6,522,342 B1 | 2/2003 | Gagnon et al. |
| 6,532,312 B1 | 3/2003 | Corkran |
| 6,535,888 B1 | 3/2003 | Vijayan et al. |
| 6,570,582 B1 | 5/2003 | Sciammarella et al. |
| 6,571,279 B1 | 5/2003 | Herz |
| 6,583,800 B1 * | 6/2003 | Ridgley et al. ............... 715/854 |
| 6,606,103 B1 | 8/2003 | Hamlet et al. |
| 6,606,280 B1 | 8/2003 | Knittel |
| 6,606,347 B1 | 8/2003 | Ishii |
| 6,608,633 B1 | 8/2003 | Sciammarella et al. |
| 6,615,247 B1 | 9/2003 | Murphy |
| 6,615,248 B1 | 9/2003 | Smith |
| 6,618,039 B1 | 9/2003 | Grant et al. |
| 6,631,523 B1 | 10/2003 | Matthews, III et al. |
| 6,636,246 B1 | 10/2003 | Gallo et al. |
| 6,647,373 B1 | 11/2003 | Carlton-Foss |
| 6,662,224 B1 * | 12/2003 | Angwin et al. ............... 709/224 |
| 6,680,714 B2 | 1/2004 | Wilmore |
| 6,684,062 B1 | 1/2004 | Gosior et al. |
| 6,692,358 B2 | 2/2004 | Lawrence et al. |
| 6,704,727 B1 | 3/2004 | Kravets |
| 6,711,552 B1 | 3/2004 | Kay |
| 6,714,534 B1 | 3/2004 | Gerszberg et al. |
| 6,728,731 B2 | 4/2004 | Sarukkai et al. |
| 6,769,989 B2 | 8/2004 | Smith et al. |
| 6,804,786 B1 | 10/2004 | Chamley et al. |
| 6,826,572 B2 | 11/2004 | Colace et al. |
| 6,829,646 B1 | 12/2004 | Philyaw et al. |
| 6,857,102 B1 * | 2/2005 | Bickmore et al. ......... 715/501.1 |
| 6,868,525 B1 | 3/2005 | Szabo |
| 6,907,556 B2 | 6/2005 | McElfresh et al. |
| 6,925,595 B1 | 8/2005 | Whitledge et al. |
| 6,928,610 B2 * | 8/2005 | Brintzenhofe et al. ........ 715/517 |
| 6,938,073 B1 | 8/2005 | Mendhekar et al. |
| 6,973,669 B2 | 12/2005 | Daniels |
| 6,978,263 B2 | 12/2005 | Soulanille |
| 7,013,435 B2 | 3/2006 | Gallo et al. |
| 7,020,845 B1 * | 3/2006 | Gottfurcht et al. .......... 715/853 |
| 7,051,281 B1 | 5/2006 | Yokota |
| 7,174,512 B2 | 2/2007 | Martin et al. |
| 7,293,276 B2 | 11/2007 | Phillips et al. |
| 7,383,515 B2 | 6/2008 | Bardon et al. |
| 2001/0003845 A1 | 6/2001 | Tsukamoto et al. |
| 2001/0012286 A1 | 8/2001 | Huna et al. |
| 2001/0016947 A1 | 8/2001 | Nishikawa et al. |
| 2001/0034647 A1 | 10/2001 | Marks et al. |
| 2001/0042002 A1 | 11/2001 | Koopersmith |
| 2001/0044751 A1 | 11/2001 | Pugliese, III et al. |
| 2001/0049824 A1 | 12/2001 | Baker et al. |
| 2001/0051903 A1 | 12/2001 | Hansmann et al. |
| 2002/0007309 A1 | 1/2002 | Reynar |
| 2002/0010642 A1 | 1/2002 | Go |
| 2002/0016750 A1 | 2/2002 | Attia |
| 2002/0029339 A1 | 3/2002 | Rowe |
| 2002/0032782 A1 | 3/2002 | Rangan et al. |
| 2002/0035174 A1 | 3/2002 | Alpdemir |
| 2002/0038256 A1 | 3/2002 | Nguyen |
| 2002/0038259 A1 | 3/2002 | Bergman et al. |
| 2002/0042914 A1 | 4/2002 | Walker et al. |
| 2002/0042921 A1 | 4/2002 | Ellis |
| 2002/0049631 A1 | 4/2002 | Williams |
| 2002/0056098 A1 | 5/2002 | White |
| 2002/0059590 A1 | 5/2002 | Kitsukawa et al. |
| 2002/0067376 A1 | 6/2002 | Martin et al. |
| 2002/0077177 A1 | 6/2002 | Elliott |
| 2002/0078006 A1 | 6/2002 | Shteyn |
| 2002/0078453 A1 | 6/2002 | Kuo |
| 2002/0098834 A1 | 7/2002 | Yuen |
| 2002/0116292 A1 | 8/2002 | Palatin |
| 2002/0116320 A1 | 8/2002 | Nassiri |
| 2002/0166122 A1 | 11/2002 | Kikinis et al. |
| 2003/0046182 A1 | 3/2003 | Hartman |
| 2003/0074661 A1 | 4/2003 | Krapf et al. |
| 2003/0095525 A1 | 5/2003 | Lavin et al. |
| 2003/0126607 A1 | 7/2003 | Phillips et al. |
| 2003/0140017 A1 | 7/2003 | Patton et al. |
| 2003/0146940 A1 | 8/2003 | Ellis et al. |
| 2003/0149628 A1 | 8/2003 | Abbosh et al. |
| 2003/0182195 A1 | 9/2003 | Kumar |
| 2004/0003412 A1 | 1/2004 | Halbert |
| 2004/0098747 A1 | 5/2004 | Kay et al. |
| 2004/0103439 A1 | 5/2004 | Macrae et al. |
| 2004/0117831 A1 | 6/2004 | Ellis et al. |
| 2004/0128137 A1 | 7/2004 | Bush et al. |
| 2004/0133848 A1 | 7/2004 | Hunt et al. |
| 2004/0148625 A1 | 7/2004 | Eldering et al. |
| 2004/0204116 A1 | 10/2004 | Ben-Efraim et al. |
| 2004/0210824 A1 | 10/2004 | Shoff et al. |
| 2004/0260689 A1 | 12/2004 | Colace et al. |
| 2005/0010949 A1 | 1/2005 | Ward et al. |
| 2005/0025550 A1 | 2/2005 | McLoone |
| 2005/0075932 A1 | 4/2005 | Mankoff |
| 2005/0086690 A1 | 4/2005 | Gilfix |
| 2005/0091118 A1 | 4/2005 | Fano |
| 2005/0160458 A1 | 7/2005 | Baumgartner |
| 2005/0234895 A1 | 10/2005 | Kramer |
| 2005/0246231 A1 | 11/2005 | Shkedi |
| 2006/0155598 A1 | 7/2006 | Spurr et al. |
| 2006/0224987 A1 | 10/2006 | Caffarelli |
| 2007/0008332 A1 | 1/2007 | Smith |

FOREIGN PATENT DOCUMENTS

| | | |
|---|---|---|
| EP | 1107100 A1 | 6/2001 |
| WO | WO-01/75678 | 10/2001 |
| WO | EP-1276318 A1 | 1/2003 |

OTHER PUBLICATIONS

Susan Decker, "Google Seeks to Invalidate Rival Overture's Web Search Patent," www.detnews.com, Jun. 20, 2002.
Stephanie Olsen and Gwendolyn Mariano, "Overture Sues Google Over Search Patent," www.news.com, Apr. 5, 2002.
Danny Sullivan, "Overture Files Patent Lawsuit Against Google," searchenginewatch.com, May 6, 2002.
Anon, "Videotron LTEE: Videoway Launches Two New Services: Parental Control and Instant Program Listings," Dec. 13, 1994.
Charles Heinemann, "Going from HTML to XML," Microsoft Corporation, Nov. 5, 1998.
"How to Know When Your Buddies are Online," AOL, 1997.
Written Opinion dated Jun. 6, 2002, issued in PCT/US00/30248.
www.homedepot.com, Feb. 21, 2002, accessed Aug. 17, 2005 via www.archive.org.
Press Release, Delphi's Communiport Integrated Navigation Radio Mapping the Future of Audio, Jan. 7, 2002.
News Release, New York Stock Exchange, Jan. 3, 2002, "Delphi to Spruce Holiday Wish Lists for 2002".
Business Editors, Technology & Marketing Writers, "Marketers Struggle to Achieve ROI on 'Affiliate Marketing' Programs; Dynamic Trade Brings Marketers to Next Level," Business Wire, New York, Jan. 31, 2000, p. 1.

www.walmart.com, Mar. 31, 2001, accessed Sep. 1, 2005 via www.archive.org.

Julie Newman and Kenneth A. Kozar, "A Multimedia Solution to Productivity Gridlock: A Re-Engineered Jewelry Appraisal System at Zale Corporation," MIS Quarterly, Minneapolis, Mar. 1994, vol. 18, Issue 1, p. 21.

Definition of "interface" (n), Microsoft Press Computer Dictionary, 3rd ed. (Redmond WA: Microsoft Press, 1997).

Business Editors/Hi-Tech Writers, "Paytrust.com Launches Highly Rewarding Affiliate Program," Business Wire, New York, Sep. 15, 1999, p. 1 (recovered from ProQuest database Mar. 4, 2006).

"Handhelds get better net compatibility," Paul McDougall; Information Week; Oct. 11, 1999, p. 28.

"IBM Speeding up Web data for sub-PC clients," marc Songini; Network World; Sep. 27, 1999, p. 8.

"Internet by Proxy"; Amy Helen Johnson; Computerworld; Aug. 30, 1999; 33, 35; p. 66.

"Riverbed Aims Small"; Aaron Ricadela; Information Week; Jul. 26, 1999; 745; p. 24.

"Extending the Internet" Steve Zurier; InternetWeek. Manhasset; Jun. 21, 1999, Iss. 770; p. 49.

"Enterprise resource planning goes mobile" ; Stannie Holt, et al., InfoWorld, Sep. 6, 1999; 21, 36, p. 12.

"Client-Server Computing in Mobile Environments" Jin Jung; Abdelsalam (SUMI) Helal and Ahmed Elmagarmid; ACM Computing Surveys, vol. 31, No. 2, Jun. 1999.

"AvantGo server eases handheld access to enterprise applications" Jason Meserve; Network World; Sep. 6, 1999; 16, 36; ABI/Inform Global p. 21.

"Tougher Web-Site Coding" Jason Levitt; InformationWeek; Mar. 8, 1999; 724, p. 51.

"New Web Whopper"; Joshua Piven; Computer Technology Review; Sep. 1999; 19, 9; p. 1.

"Wireless Markup Language as a Framwork for Interaction with Mobile Computing Communication Device" Jo Herstad, et al., Proceedings of the First Workshop on Haman Computer Ineraction with Mobile Devices; http://www.dcs.gla.ac.uk/johnson/papers/mobile/HCIMD1.html (66 of of 80) Jun. 7, 2006 7:30:35am.

"In the Palm of Your Hand"; Kimberly Patch and Eric Smalley; Power Source; WebBusiness Magazine; May 1, 1999.

"Oasis 1.0 Offers 'Author ONce, View Anywhere' Solution"; Anonymous; Information Today; Mar. 1999, 16, 3; p. 41.

Telecommunications (A Special Report): The Users—In the Palm of Your Hand: Companies are searching to fit the Web on the screens of hand-held gadgets Lisa Bransten; Sep. 20, 1999; Handheld computers, Internet Access, Series & special reports, Wireless communications.

"Spyglass Readies Technology Blitz" Michael Kanellos; Computer Reseller News; Dec. 9, 1996; 714; p. 24.

"Sprint Brings the Power of the Wireless Internet to the Palm of Your Hand With the Introduction of the Sprint PCS Wireless Web—Company Business and Marketing" Edge: Work-Group Computing Report; Aug. 16, 1999.

"West: A Web Browser for Small Terminals" S. Bjork, et al.; CHI Letters vol. 1, 1 pp. 187-196.

"Wireless Application Protocol WAP 2.0; Technical White Paper" www.wapforum.org; Jan. 2002 13 pages.

"New Standard to Bolster Wireless Internet Transactions"; anonymous; Information Week; Oct. 18, 1999; ABI/Form Global, p. 30.

"WAP Definition"; Amy Helen Johnson; Computerworld; Nov. 1, 1999; 33, 44; ABI/Inform Global; p. 69.

Remhof, K.; "The Gadgeteer—Palm VII Review"; May 25, 1999; http://www.the-gadgeteer.com/review/palm_vii_review.

Barnett, S.; "Palm VII"; Pen Computing; http://www.pencomputing.com/palm/Reviews/palm7_main.html.

Shirriff, K.; "PalmPilot: Tiny Viewer"; http://www.righto.com/pilot/tv.html.

Sorenson, D.; "PC Expo 1999: a Mac perspective"; MacInTouch Special Reports; Jun. 27, 1999; http://macintouch.com/pcexpo1999.html.

\* cited by examiner

APPARATUS AND METHOD OF MANIPULATING A REGION ON A WIRELESS DEVICE SCREEN FOR VIEWING, ZOOMING AND SCROLLING INTERNET CONTENT

CLAIM OF PRIORITY

This application, is a continuation of U.S. patent application Ser. No. 09/518,015, filed Mar. 3, 2000, which is a continuation-in-part of U.S. patent application Ser. No. 09/440,214, filed Nov. 15, 1999, issued as U.S. Pat. No. 6,600,497, each of which are incorporated herein by reference.

BACKGROUND (1) Field of the Invention

The invention relates to electronic information services and electronic commerce services. More specifically, the invention relates to providing easy navigation to facilitate access to such services and improved web access through a television display, internet appliance, and wireless devices.

(2) Background

The importance of the Internet as a tool of electronic commerce can not be overstated. The ability of consumers to buy products, obtain information from the comfort of their own home is revolutionizing the way business is done. Increasingly, there is a push to provide access to the Internet on standard television monitors through the use of set top boxes. Over time, much like cable-ready televisions, it is expected that Internet-ready televisions will proliferate. Unfortunately, even on large screen televisions the web surfing experience is poor, inasmuch as the web content is illegible and/or unnegotiable, unless you happen to be sitting very close to the television. Generally, this makes web surfing impractical in more traditional television environments. As the television web access systems proliferate, improved navigation and content access on the television is likely to become a necessity.

BRIEF SUMMARY OF THE INVENTION

A method and apparatus of simplified navigation is disclosed. A web page is provided having a link to a sister site. The sister site facilitates simplified navigation. Pages from the sister site are served responsive to actuation of the sister site link. In one embodiment, the sister site includes matrix pages to permit matrix navigation.

BRIEF DESCRIPTION OF THE DRAWINGS

FIG. 2b is an exemplary first matrix page of a sister site for the web page of FIG. 2a.

FIGS. 10a-g are a series of matrix layers displayed during an exemplary navigation using one embodiment of the invention.

DETAILED DESCRIPTION

A simplified system for navigation of the Internet or other content source allows access to the content and services available thereon with greater ease, on, for example, a display more remote from a user than in the use of the "traditional" personal computer (PC) two foot paradigm.

Figure 1:
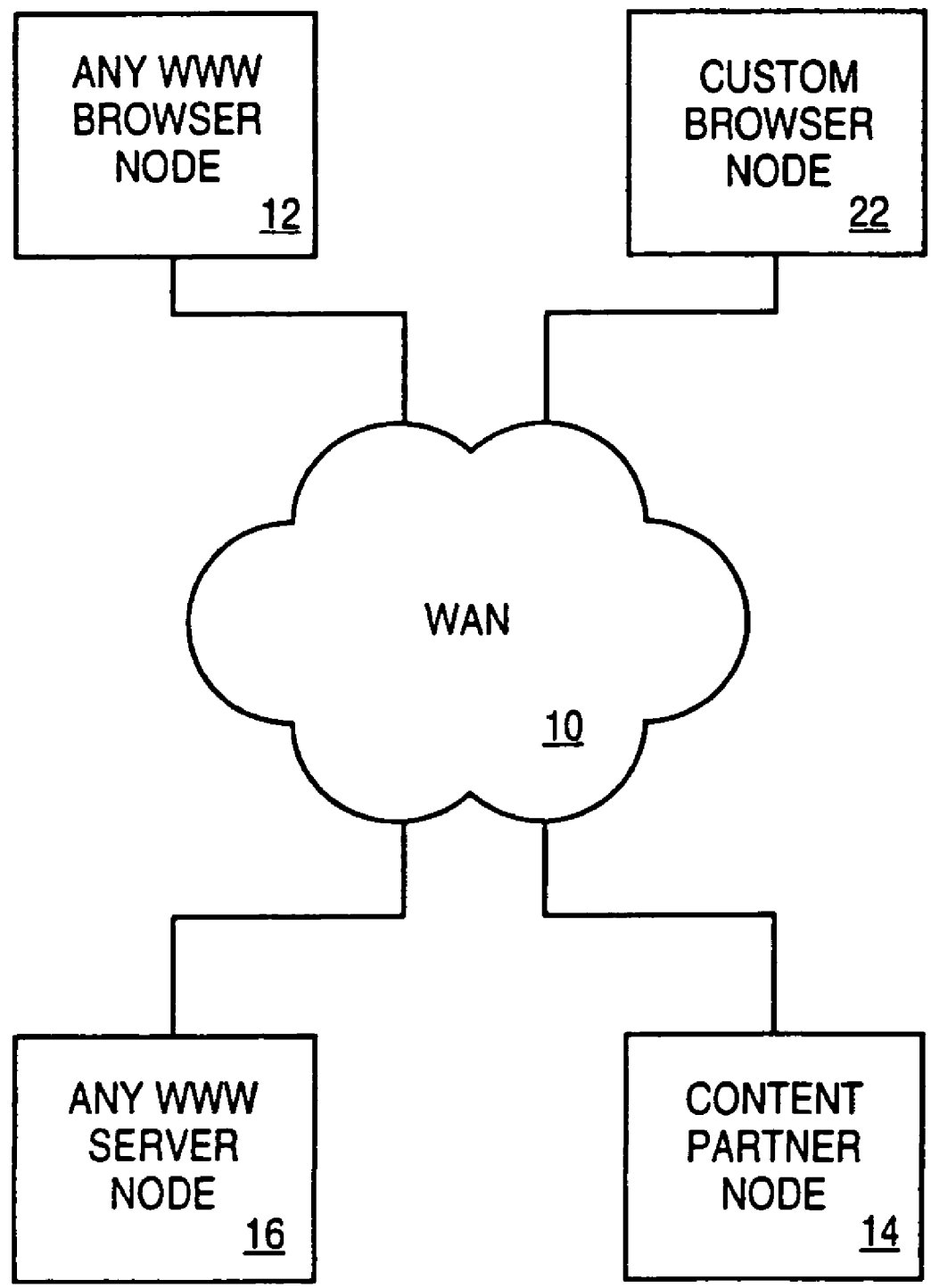
FIG. 1 is a block diagram of a system employing one embodiment of the invention.

FIG. 1 is a block diagram of a system employing one embodiment of the invention. A wide-area network (WAN) 10, such as the Internet, couples together a plurality of communication nodes. Some nodes, such as node 12, may be a standard prior art PC executing any conventional web browser. Alternatively, node 12 might be a set top box and television, or an internet appliance, or a wireless device, such as a web-enabled cell phone. Additionally, there are server nodes connected to WAN 10, such as server node 16, which may be any conventional web server. Also coupled to WAN 10 are browser nodes 22 running a custom browser that facilitate access to information and services provided to the custom browser node 22. The custom browser node 22 as well as any browser nodes 12 are collectively referred to as client nodes. Content partners, such as content partner node 14 provide content in a specified format that facilitates its use by the client nodes 12, 22. In one embodiment, when a user accesses a content partner home page, they have the option of linking to a sister site. As used herein, "sister site" is deemed to mean a site that provides for navigation of the site using a simplified navigation system, such as matrix navigation described in more detail below. In one embodiment, the sister site is traditional HTML pages converted to a matrix format to permit matrix navigation. This conversion may be done using an XML transcoding or any other suitable language.

Content partners may maintain a database of sister site web pages corresponding to the pages in the general use site. Alternatively, content partners may provide a facility for converting web pages on the fly to the sister site format. Content partners may also provide for segmentation of the base HTML web pages and/or the matrix pages. A segmentation may be performed in a number of ways. The page may be divided up based on content or area. The net result, in any case, is that the web page is divided into regions which are not necessarily, but may be, of equal size. The individual regions may be brought into focus independently. By "brought into focus," the concept of focus in this context is analogous to the front window in a windowing system. The focus region is deemed active and subject to client manipulation. In the context of a matrix page, one suitable segmentation is by cell, e.g., each cell corresponds to a region that may be independently brought into focus. The borders of the regions may or may not be visible on the web pages displayed. This segmentation facilitates tab, scroll, and zoom features described in more detail below. Alternatively, segmentation may be performed as part of a custom browser on custom browser nodes or may be instantiated as a hardware or firmware solution within, for example, the set top box.

Figure 2A:
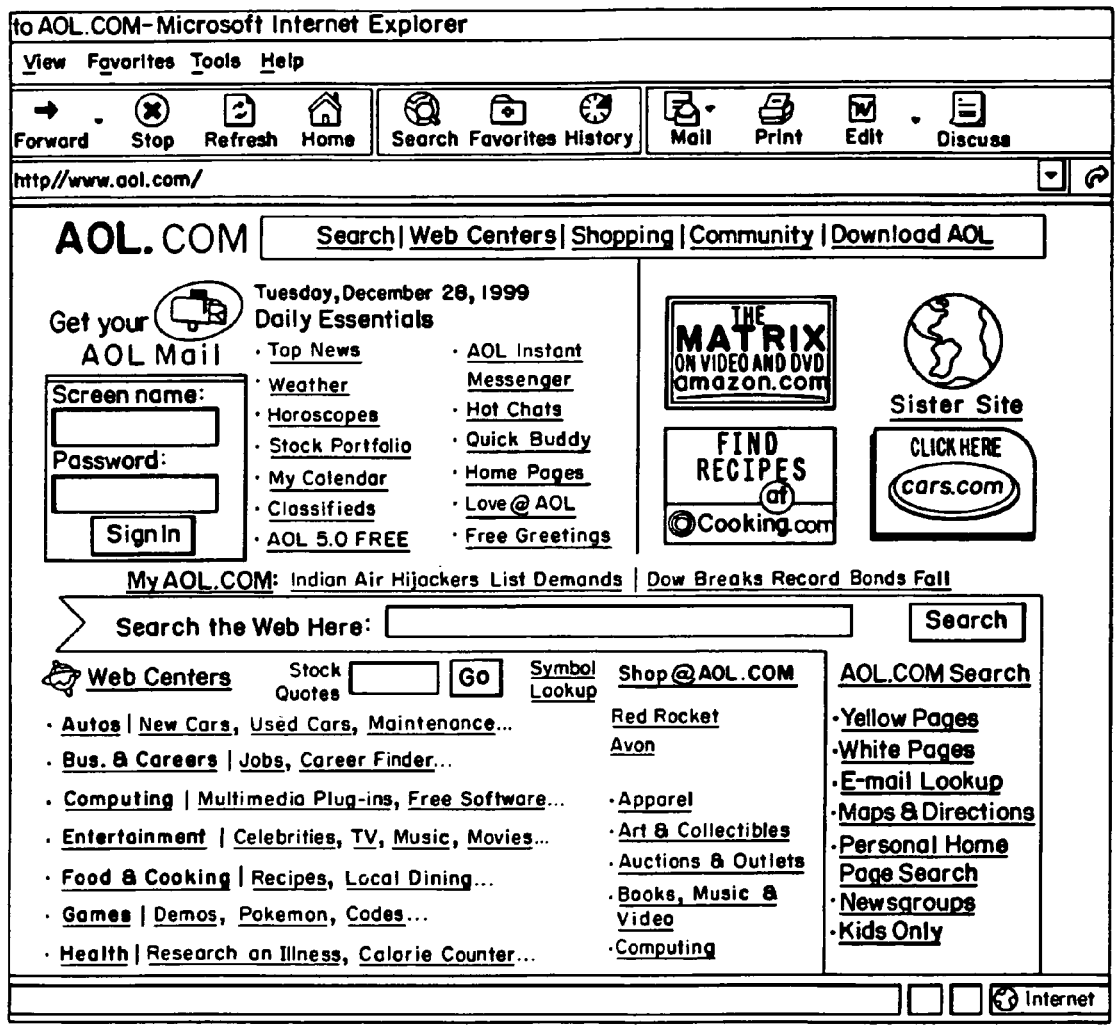
FIG. 2a is an exemplary web page having a sister site link.
Figure 2B:
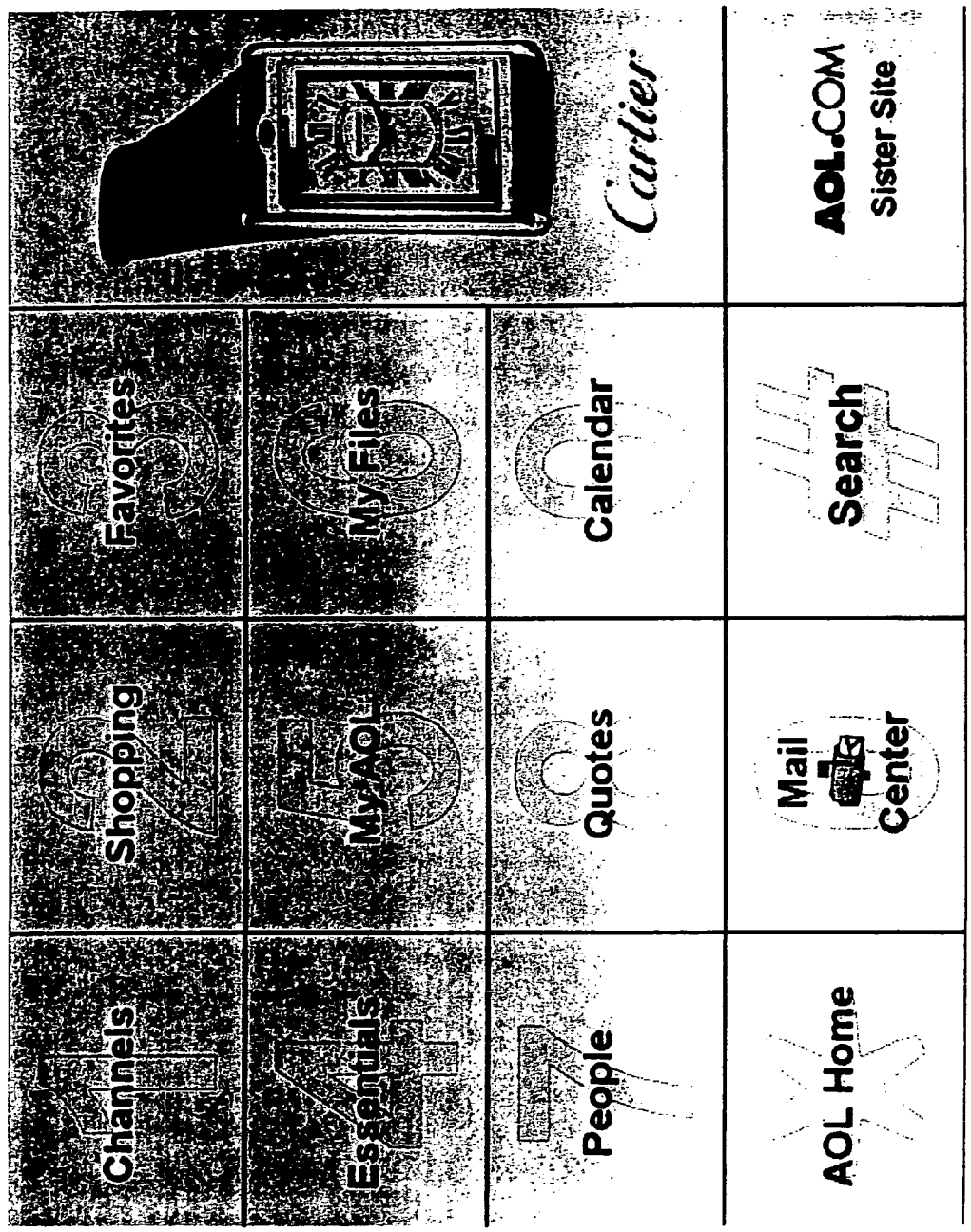
Figure 2C:
FIG. 2c is a web page having irregular segmentation.

FIG. 2a is an exemplary web page having a sister site link. By actuating the link, the client begins receiving matrix pages as described in more detail below. FIG. 2b shows an example first matrix page reached by activating the sister site link in FIG. 2a. FIG. 2c is a web page having irregular segmentation. Through segmentation, the page is divided into regions. Individual regions may then be brought into focus permitting simplified navigation, viewing, and manipulation of the data within that region.

Figure 3:
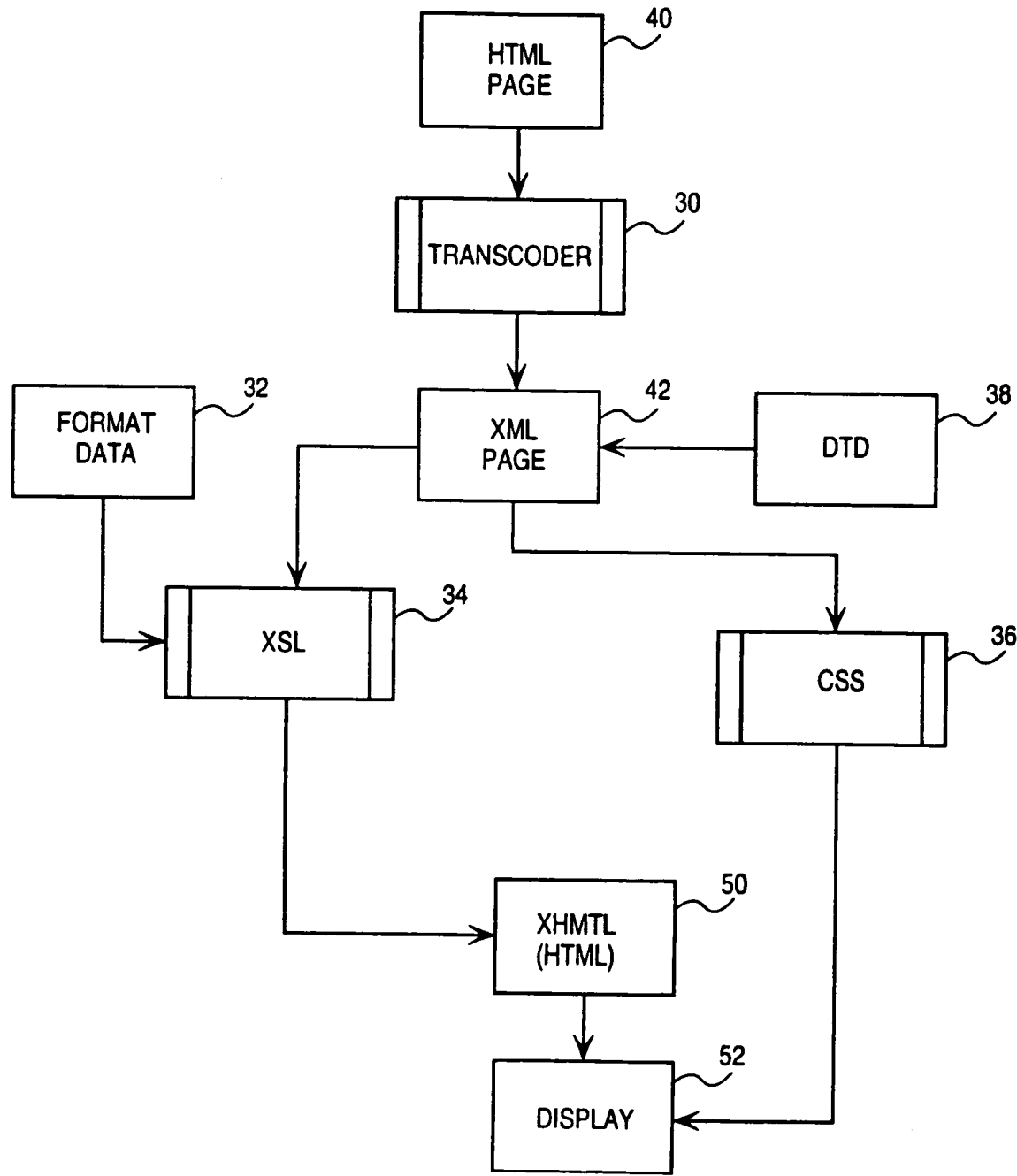
FIG. 3 is a flow diagram of conversion of standard HTML pages to a sister site format in one embodiment of the invention.

FIG. 3 is a flow diagram of conversion of standard HTML pages to a sister site format in one embodiment of the invention. A hypertext markup language (HTML) page 40 is transcoded by a transcoder 30 to yield, for example, an XML page 42 to which a document type definition (DTD) 38 is applied. The DTD 38 specifies the rules for the structure of the resulting XML document. The XML page is then reformatted using extensible style language (XSL) 34 to corresponding format data 32. XSL is not currently supported by all standard browsers. Thus, after formatting, the XML document is translated to an extensible hypertext markup language (XHTML) document for subsequent display by a client side browser on display 52. Alternatively, the XML page may have a cascading style sheet (CSS) applied to achieve the desired format. One advantage of the CSS is that it is supported by standard browsers. After application of the CSS, the resulting formatted page can be displayed by the client browser on display 52.

The above-described conversion may be done by a content partner in advance of request for pages or may be done on the fly responsive to requests for pages. The determination of which to do involves a trade off between latency in providing requested pages and storage space required to store the additional pages. Some on the fly conversion is desirable in the event that a user attempts to access a web site that has not previously been converted. It is also within the scope and contemplation of providing for conversion on the client side.

Figure 4:
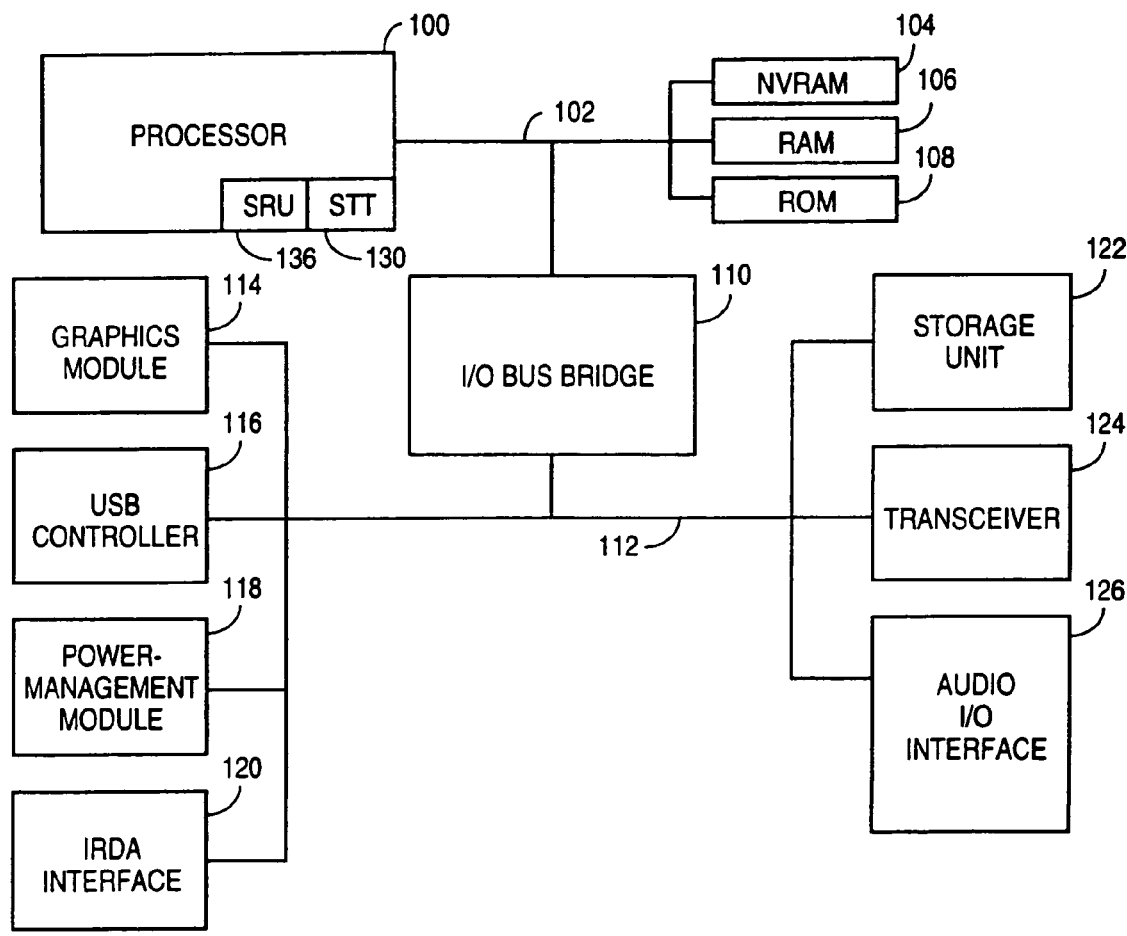
FIG. 4 is a block diagram of a client hardware architecture of one embodiment of the invention.

FIG. 4 is a block diagram of a client hardware architecture of one embodiment of the invention. A processor 100 is coupled to various memory units and an I/O bus bridge 110 by a local bus 102. Among the expected memory units are random access memory (RAM) 106, which may be any standard RAM, including standard dynamic random access memory (DRAM), and may be symmetric or asymmetric. Also coupled to bus 102 is a read-only memory (ROM) unit 108. The ROM will typically include the boot code for the processor 100. A non-volatile RAM (NVRAM) unit 104 is also coupled to the bus.

The I/O bus bridge 110 is coupled to the local bus 102 and bridges to the I/O bus 112. A number of units may reside on the I/O bus, including a graphics module 114 that couples to a display (not shown), a universal serial bus (USB) controller that may couple the system to any number of additional USB devices. Common USB devices include keyboards, mice, cameras, scanners, printers, and other peripheral components and input/output devices. Also coupled to the I/O bus may be power management module 118, which may be coupled to the power switch and may include conventional power conservation protocols, ensuring the processor 100 is permitted to orderly conclude its current operation before changing power states.

An infrared data association (IrDA) interface 120 permits the terminal to be coupled to hand-held devices, if desired. In some embodiments, a keyboard may be coupled by an Ir link. Storage unit 122, which may, for example, be a flash memory unit, is used for long-term storage of data or files. A transceiver 124 is used to permit the processor to communicate with the hub, whether it be a point-to-point link or across a wide-area network. The transceiver 124 may be, but is not limited to, an ethernet transceiver, a modem, digital subscriber line (DSL) or cable modem. It is expected that the processor 100 will communicate through the transceiver 124 to the server using transmission control protocol/internet protocol (TCP/IP). Encryption and compression within the terminal may be handled by conventional hardware or software solutions.

Audio I/O interface 126 may include an internal microphone and speaker which permits audio input and output. This is particularly useful in the context of voice e-mail or voice over IP communications. Additionally, some embodiments of the invention will include speech to text (STT) capability 130 and speech recognition (SR) capability 136. Various embodiments may implement these capabilities as hardware or software or a combination of both. In embodiments having SR capability, for simplicity of use, it is desirable to use one of the multiple user SR packages available today and expected to improve in the future, as these packages avoid the necessity of "training" the system. This permits recognition of content of speech and conversion to text.

For purposes of reduced cost, it may be desirable to use a particularly simple speech recognition package, recognizing only, for example, numbers and letters. A suitable speech recognition package will permit a user to navigate the WAN as subsequently described using voice commands and composed e-mails in a hands-free manner. Such an embodiment has the additional advantage that it enables Internet access to the physically challenged. In some embodiments, SR 136 is present, but STT 130 is not. This may permit the processor to respond to voice commands but would not permit composition of e-mail, for example.

In one embodiment of the invention, the terminal has a notebook form factor with an integrated LCD display. In an alternative embodiment, the form factor is a set-top box, which relies on an external display, such as a television or external monitor. In either case, a standard QWERTY keyboard could be used. In the set top box embodiment, a wireless keyboard or remote is desirable.

Figure 5A:
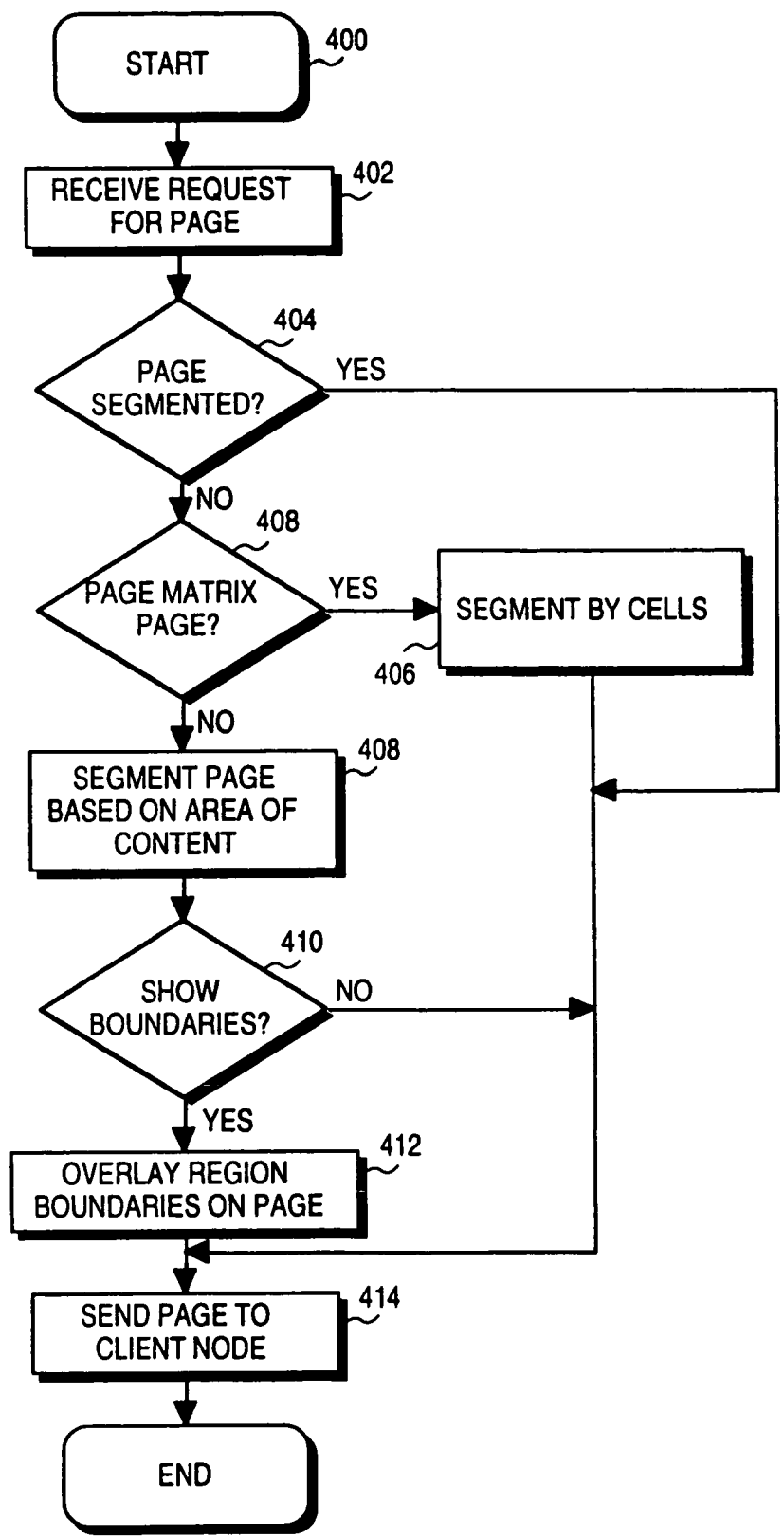
FIG. 5a is a flow diagram of server side segmentation in one embodiment of the invention.

FIG. 5a is a flow diagram of server side segmentation in one embodiment of the invention. A request for a page is received at functional block 400. A determination is made at decision block 402 whether the requested page has been segmented. If the page has not been segmented, a determination is made at decision block 404 whether the requested page is a matrix page. If the requested page is a matrix page, at functional block 406, the cells of the matrix are each defined to be a region, thereby completing the segmentation. If the page is not a matrix page, the page is segmented either based on area or content. By "segmentation," it is meant that the page is divided into a plurality of regions. The regions may contain one or more links and/or some amount of content. This segmentation facilitates usability as discussed in more detail below. Once segmentation is complete, at functional block 408, a determination is made if the boundaries of the regions should be shown on the displayed page at decision block 410. If the boundaries are to be shown, the boundaries are overlayed on the page at functional block 412 after the overlay, or if no boundaries are to be shown, the page is sent to the client node at functional block 414.

Figure 5B:
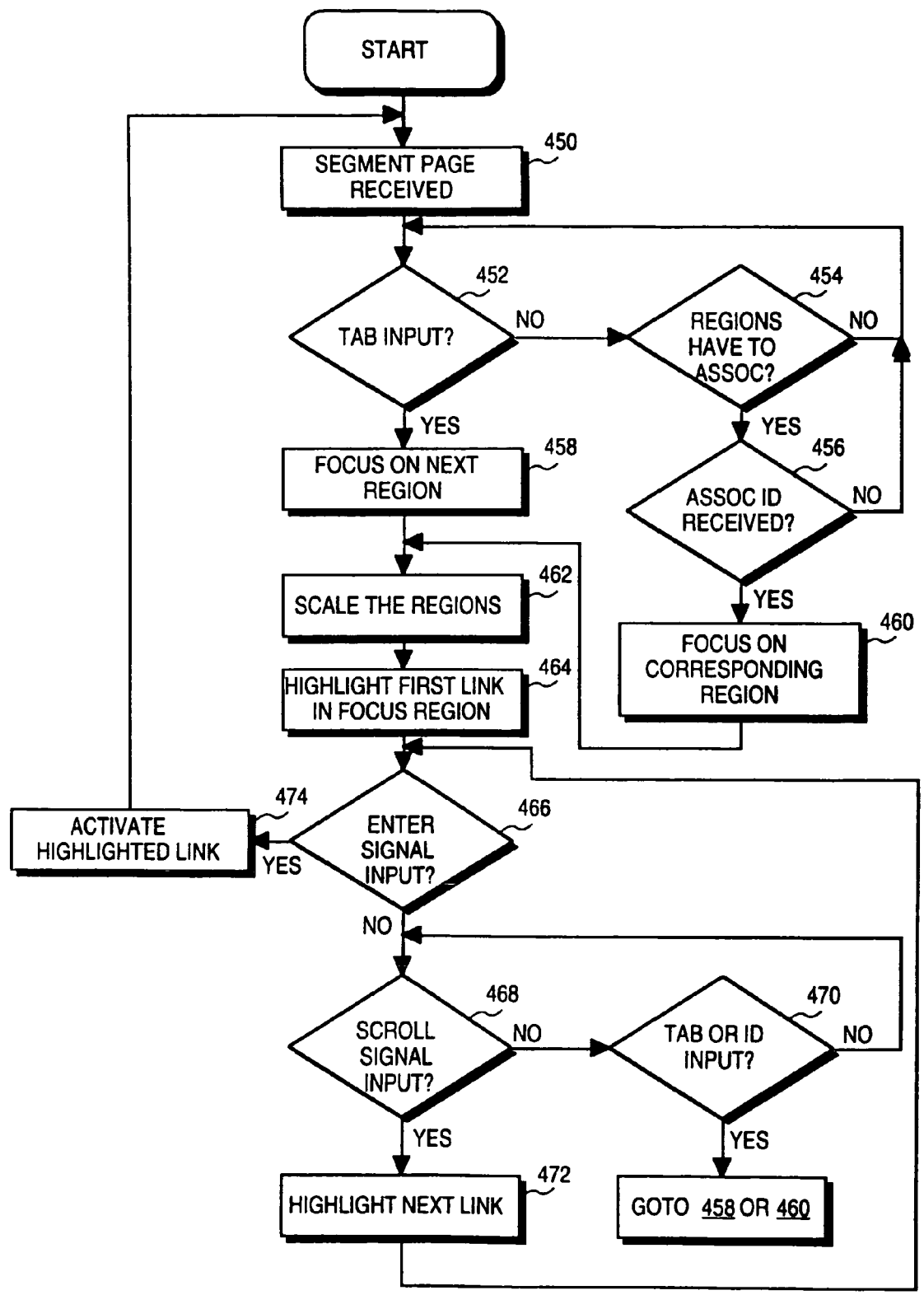
FIG. 5b is a flow diagram of client side manipulation of a segmented page in one embodiment of the invention.

FIG. 5b is a flow diagram of client side manipulation of a segmented page in one embodiment of the invention. At functional block 450, a segmented page is received at a client node. A determination is made at decision block 452 if a tab input has been received. As used herein, a tab input is any input which brings about the functionality of moving the focus from one region to another adjacent region. If no tab input has been received, a determination is made at decision block 454 if the regions have identifying symbols associated therewith. Particularly in the case of matrix pages, the different cells typically have associated therewith either an alphanumeric character or some symbol such as an asterisk or other punctuation mark to identify the cell. If there are identifications associated with the regions, a determination is made at decision block 456 if such an identification has been received as an input on the client node. If the identification has been received, the corresponding region is brought into focus. The focus region is active, and in some embodiments, the corresponding region is zoomed to increase its size relative to the inactive regions at functional block 460. If no identifications are associated with the region or no identification is received, the client waits for a tab input at decision block 452.

If a tab input is received, the next region is brought into focus. If no region is currently in focus, a first region, e.g., the uppermost leftmost region, will be brought into focus at functional block 458. At functional block 462, the regions are scaled so that the in focus region is enlarged relative to the regions which are not in focus. This is particularly desirable for web browsing in a television context where distance from the set may make reading the unscaled page difficult or impossible. Thus, by scaling region by region, readability within the region can be enhanced to permit use and browsing from a distance.

At functional block 464, a first link in the focus region is highlighted. As used herein, "highlighted" means made active such that a subsequent input, such as a predefined key press activates the link. Highlighting in the link context is analogous to focus in the region context. Highlighting may, but need not include, changing the link's appearance in any manner on the display such as, for example, changing size, color, shading, etc. A determination is made at decision block 466 if an enter signal has been received. However, if no enter signal has been received, a determination is made at decision block 468 if a scroll signal has been input at the client node. If a scroll signal has been input, a next link is highlighted at functional block 472. If an enter signal is received at functional block 466, a then highlighted link is activated at functional block 474 and a next segmented page is received, and the process begins again. Alternatively, if no scroll signal input is received at decision block 468, a determination is made at decision block 470 whether a tab or identification input has occurred. If it has, the system continues processing at blocks 458 or 460, respectively.

Figure 5C:
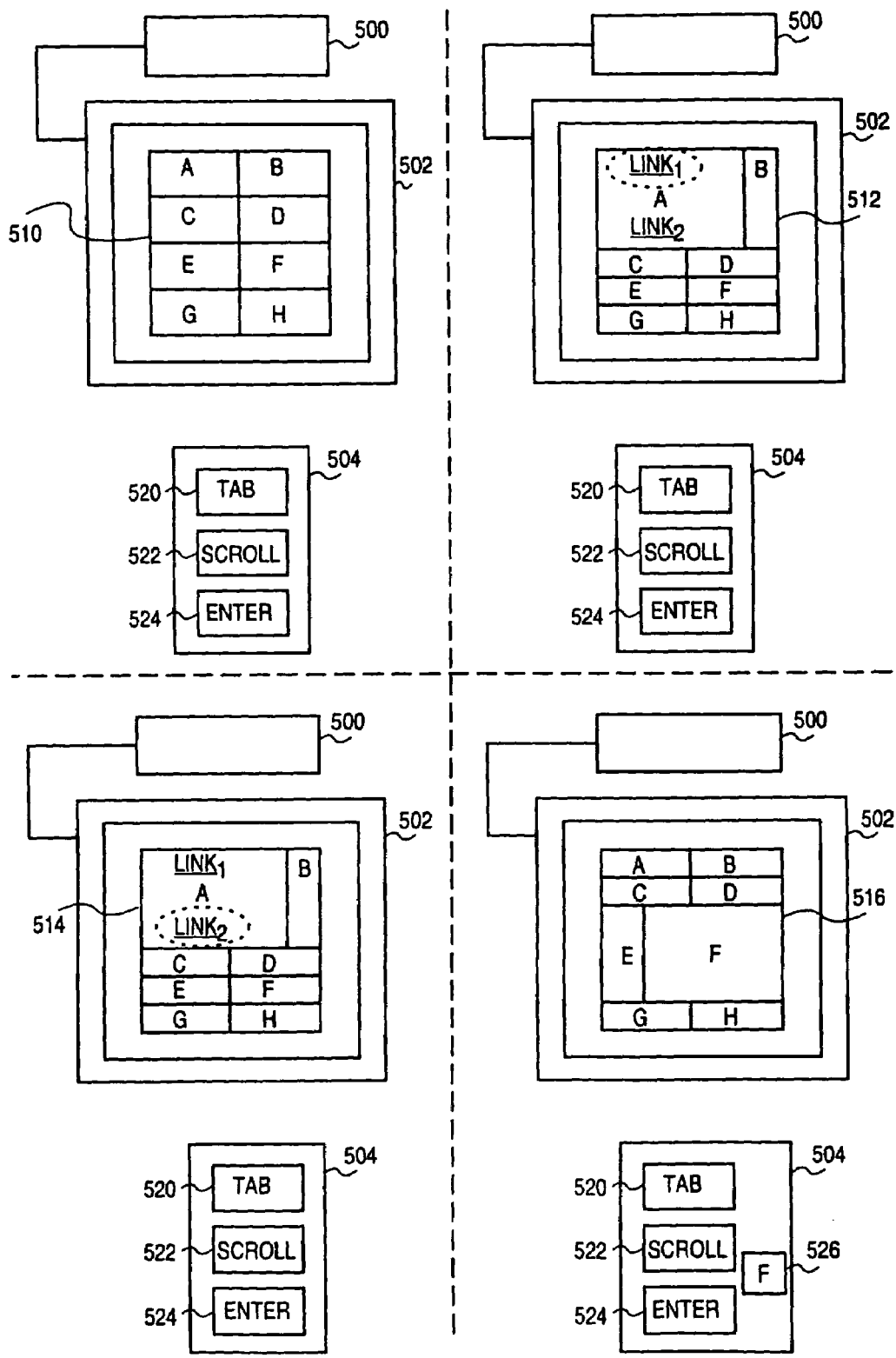
FIG. 5c is a diagram showing a system implementing the tab, scroll, and zoom features of one embodiment of the invention.

FIG. 5c is a diagram showing a system implementing the tab, scroll, and zoom features of one embodiment of the invention. A set top box 500 is coupled to a television monitor 502 and is responsive to remote control 504. Remote control 504 may be a custom remote control, a wireless keyboard, or even a standard universal remote control. Remote control 504 may be equipped with a microphone for accepting voice commands or may merely provide push button inputs. In frame one, television 502 is displaying a web page 510 that has been segmented into eight equally dimensioned regions A-H. Remote control 504 includes a tab function 520, a scroll function 522, and an enter function 524. Responsive to actuation of the tab function, region A is brought into focus, as shown in the second frame. Link one is highlighted and A is enlarged, while the remaining regions are scaled so that A is much larger relative to the other regions, thereby accomplishing a zoom function and improving readability of the information contained in region A. This is shown as web page 512. If, when A is in focus, the user actuates scroll function 522, a second link in region A is highlighted as shown on page 514. In one embodiment, scrolling within the focus region does not effect the size or representation of the non-focus regions. In the event that, at web page 512 or web page 514, the enter function 524 is actuated, $link_1$ or $link_2$ would be traversed, respectively. If the segments are actually associated with their alphanumeric designator, and that remote control 504 has alphanumeric keys, for example, letter key F 526, web page 516 shows a web page that would be reached from web page 510, 512, or 514 responsive to actuation of the F key. In web page 516, the F region is in focus, and the remaining regions are scaled to be much smaller than the F region.

These are merely illustrative examples of the tab, scroll, and zoom features of one embodiment of the invention. While the shown embodiment tiles the regions, it is within the scope and contemplation of the invention to overlay the focus region on one or more of the other regions. It is also within the scope of the invention to permit a user to increase the zoom of the focus region to exceed the physical space. In such case, scrolling within the region may be required to view the entire contents of the region. Such scrolling need not effect the display of the non-focused regions.

Figure 6:
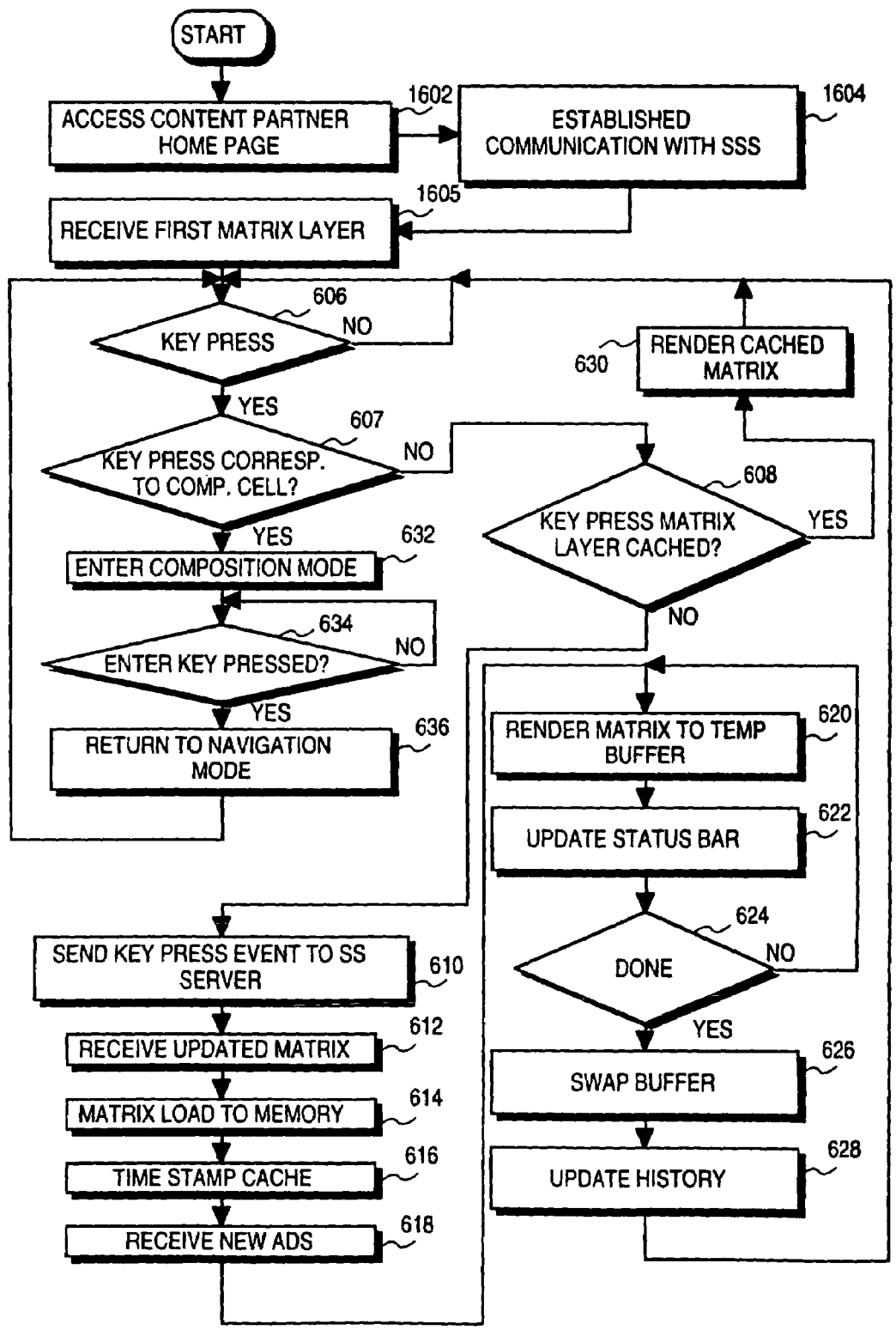
FIG. 6 is a flow chart of operations of the navigation system of one embodiment of the invention in a custom terminal custom browser node.

FIG. 6 is a flow chart of operations of the navigation system of one embodiment of the invention in a custom terminal custom browser node. Upon power-up at functional block 602, a content partners home page is accessed. In some embodiments, it may be possible to bypass access of the home page and go directly to the sister site home page. At functional block 604, a node establishes communication with a sister site server (SSS). At functional block 605, a first matrix layer is received from the SSS. At decision block 606, the node waits for a keypress. If at decision block 606, a determination is made that a key has been pressed, a determination is made at decision block 607 whether the keypress corresponds to a composition cell. A composition cell is deemed to be a cell in the navigation matrix which permits a user to enter additional data. For example, a search cell or e.g., a purchase order form or an e-mail may have one or more composition cells. If the cell is a composition cell, the system enters composition mode at functional block 632. In composition mode, the digits of the keypad represent the digits themselves, rather than navigation options. The cursor will also appear in the composition field of the composition cell. At decision block 634, a determination is made if the enter key has been pressed. The enter key is defined in one embodiment of the invention to signify the end of a composition. Thus, if the enter key has not been pressed, the system remains in composition mode. However, if at decision block 634, the enter key has been pressed, the system returns to navigation mode at functional block 636. It is also within the scope and contemplation to define other keys to instigate return to the navigation mode.

If a keypress is received and not found to correspond to a composition cell at decision block 607, a determination is made at decision block 608 whether the matrix layer corresponding to the keypress exists within the cache. In this connection, it is determined whether a representation of that matrix layer, even if in the cache, is stale and therefore needs to be freshly downloaded. If the data is stale or not present in the cache at all, the keypress event is sent to the SSS. In one embodiment, the entire navigation path, including the keypress event, is sent with each keypress. When the navigation path is sent with each keypress event, the SSS is able to identify the requested matrix layer rapidly on the fly.

Subsequently, at functional block 612, the client node receives the updated matrix layer corresponding to the keypress event. That matrix layer is loaded to the memory at functional block 614 and the cache is time-stamped at functional block 616. At functional block 618, new ads may be received from the SSS. Notably, the receipt of the ads is asynchronous with the matrix layer receipt and may occur at any time without being prompted by a keypress event. At functional block 620, the incoming matrix layer is rendered to a temporary buffer by using a double-buffering technique. The actual rendering is transparent to the user. At functional block 622, the status bar for the load is updated to indicate the percent complete of the matrix layer rendering. At functional block 624, a determination is made if the rendering is complete. If it is not, the buffer continues to render and the status bar continues to update. By regularly updating the status bar, the user is not left wondering if the device is working. This is expected to limit the frustration experienced by many new users during the wait while matrix layers are rendered. If the rendering is complete, the temporary buffer is swapped with the frame buffer and the new matrix layer is displayed at functional block 626. Then at functional block 628, the history of the navigation path is updated to reflect the new matrix layer. The system then returns to await a next keypress to indicate further navigation. By iteratively pressing appropriate keys, a user may navigate to any desired depth up to a maximum depth along any navigation path and obtain content relevant to the path navigated. If instead, the matrix layer was validly in the cache at decision block 608, the matrix layer is rendered from the cache at functional block 630 and the system awaits the next keypress.

"Maximum depth" as used herein applies on a cell by cell basis for primary navigation options. A maximum depth is reached for a cell in a navigation path when pressing a corresponding key will not take a user to a deeper matrix layer in the matrix. While content, as distinguished from the matrix layer and their cell headings, will be displayed once a maximum depth is reached, it is within the scope and contemplation of the invention to display some content in cells of an intermediate matrix layer, i.e. one that is not at the maximum depth.

"Primary navigation options" as used herein are those navigation options that necessarily change between successive matrix layers, changing from general to more specific with increases in depth in the matrix.

Figure 7:
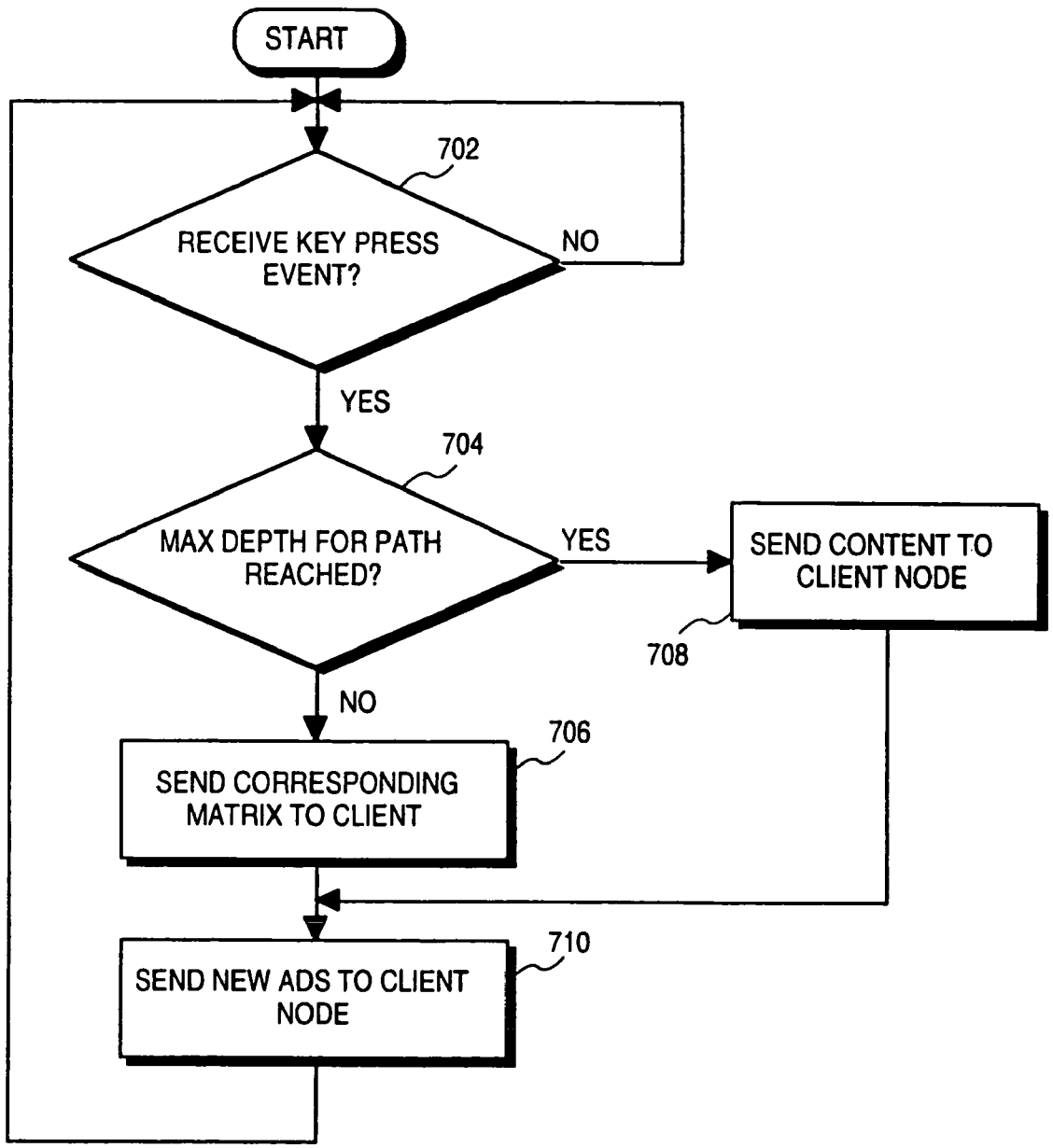
FIG. 7 is a flow diagram of operation of the sister site server of one embodiment of the invention.

FIG. 7 is a flow diagram of operation of the sister site server of one embodiment of the invention. A determination is made if the keypress event has been received at decision block 702. If the keypress event has been received, a determination is made if the matrix has reached maximum depth at decision block 704. If the matrix has not reached the maximum depth, a matrix layer corresponding to the keypress is sent at functional block 706. Such matrix layers may or may not include content in cells with navigation choices. If the matrix has reached maximum depth for that navigation path, a content layer corresponding to the keypress event is sent to the client node at functional block 708. A content layer may or may not include matrix cells in addition to the content. New ads are sent to the client node at functional block 710. The system then awaits the next keypress event from a client node.

Figure 8:
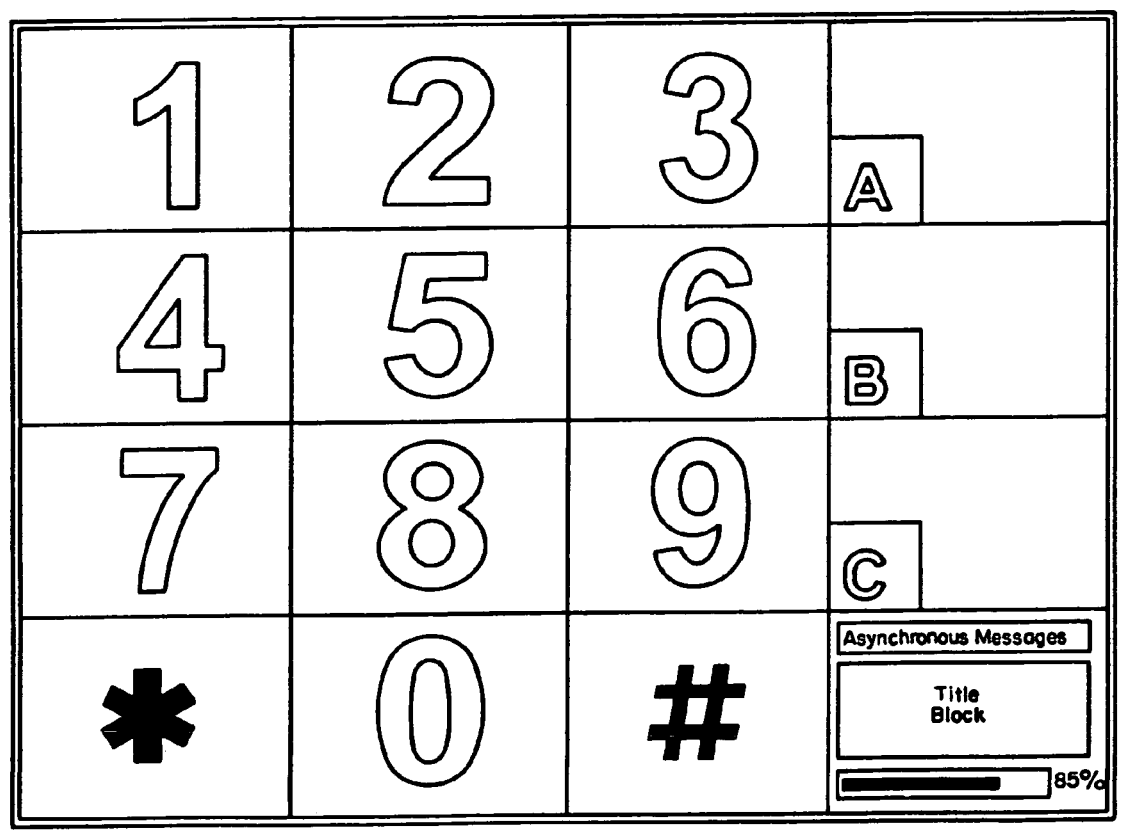
FIG. 8 is a diagram of the display of a graphical user interface of one embodiment of the invention.

FIG. 8 is a diagram of the display of a graphical user interface of one embodiment of the invention. The screen is divided into a plurality of cells. In this embodiment, there are fifteen cells that represent navigation options and one messaging cell for displaying messages from the server, the progress or status bar, and a title block. The cells can further be subdivided between the digit keys 1-9 keys which, in this embodiment, represent the primary set of navigation options and the keys designated by letters A-C which represent secondary navigation options and *, 0, and # keys that may be additional navigation options or provide specialized functions. For example, the * key may return the user to the server home site, thereby leaving matrix navigation. The ABC cells will typically hold advertising, and selecting one of those cells will generate a matrix layer with primary navigation cells directed to that advertiser or the product line being advertised. While the interface is designed to be fully accessible with minimal key strokes from a key pad, it is also within the scope and contemplation of the invention to permit selection with a mouse or other pointer device.

Figure 9A:
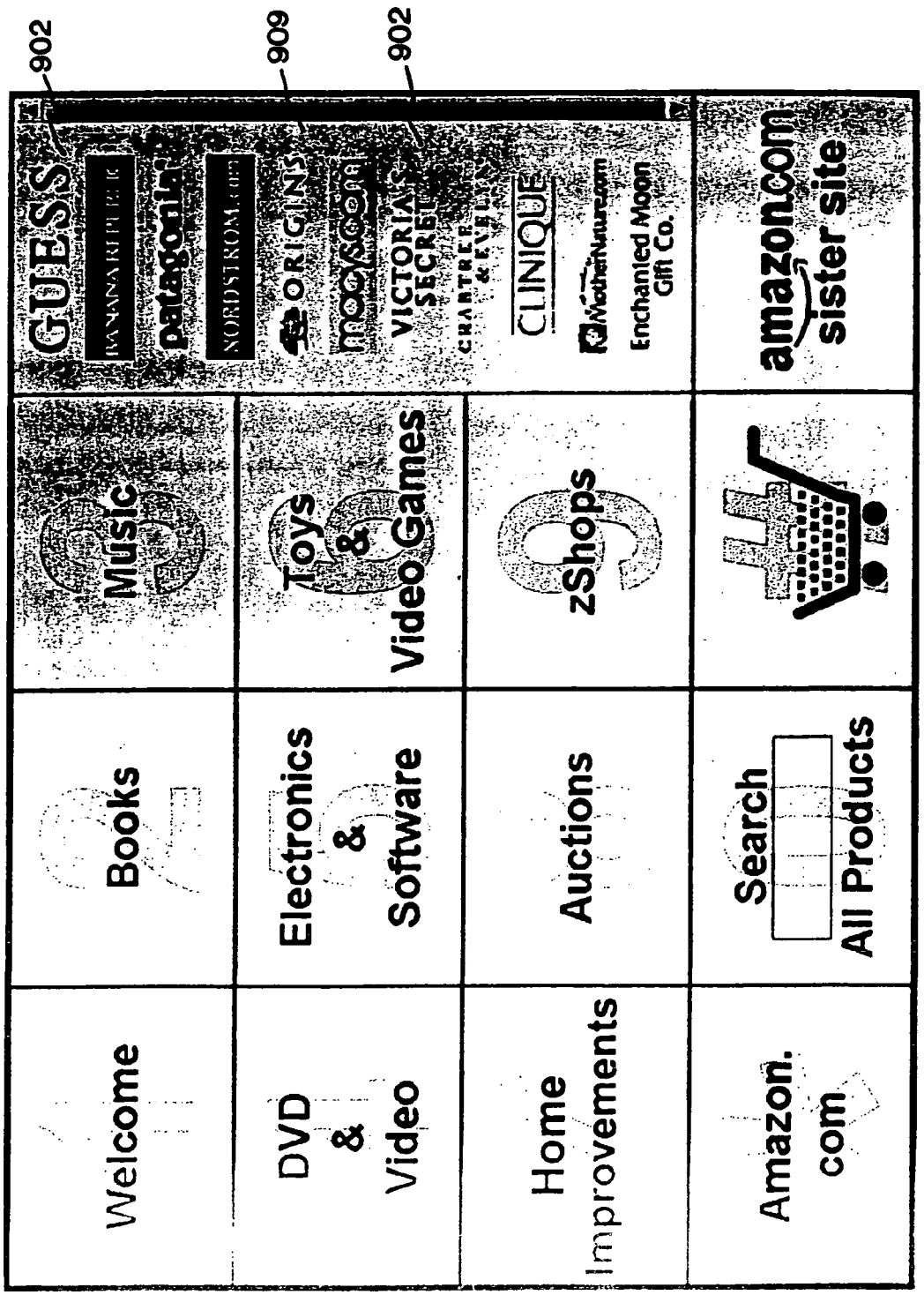
FIG. 9a-d are examples of sister site matrix pages.
Figure 9B:
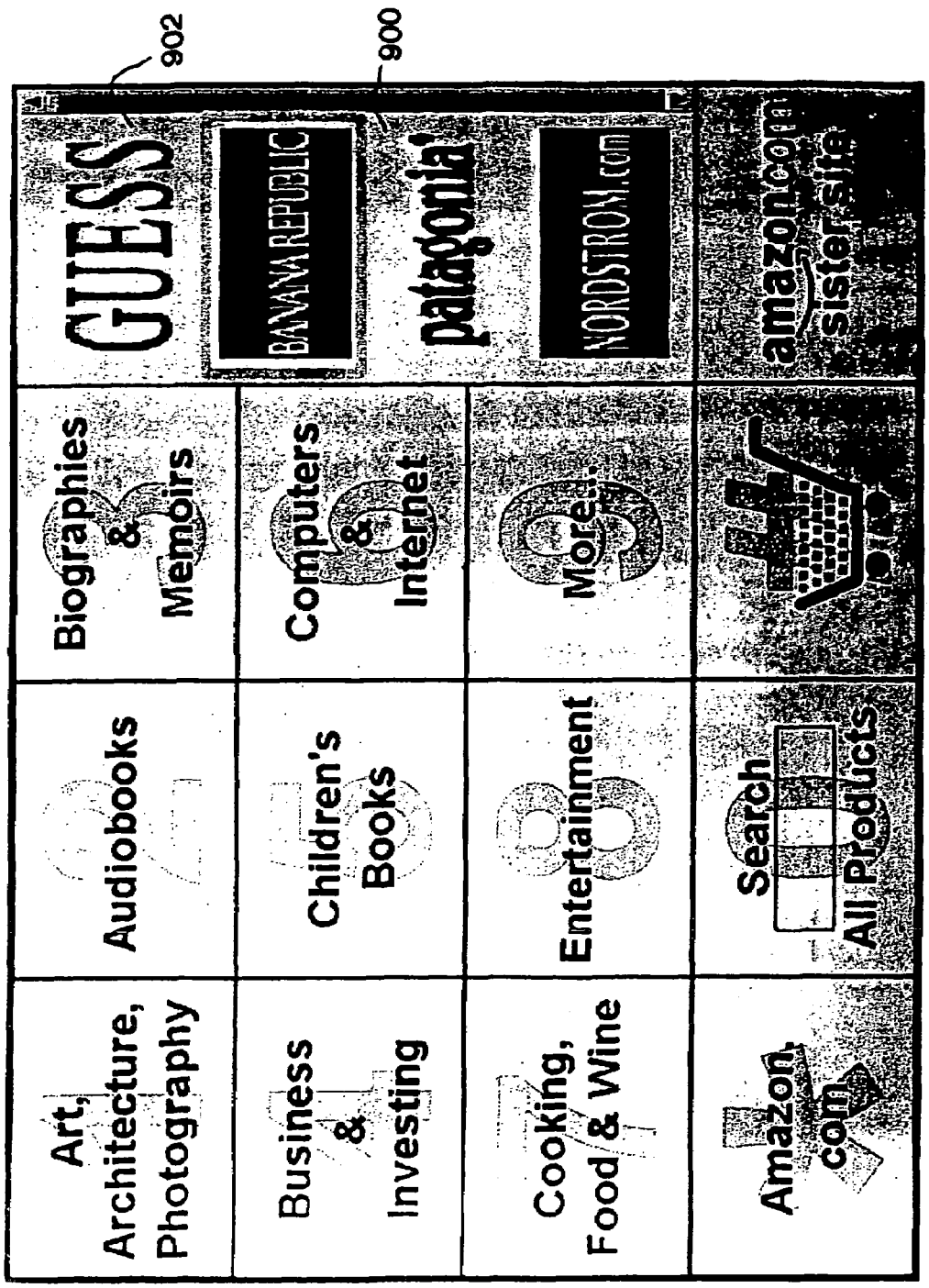
Figure 9C:
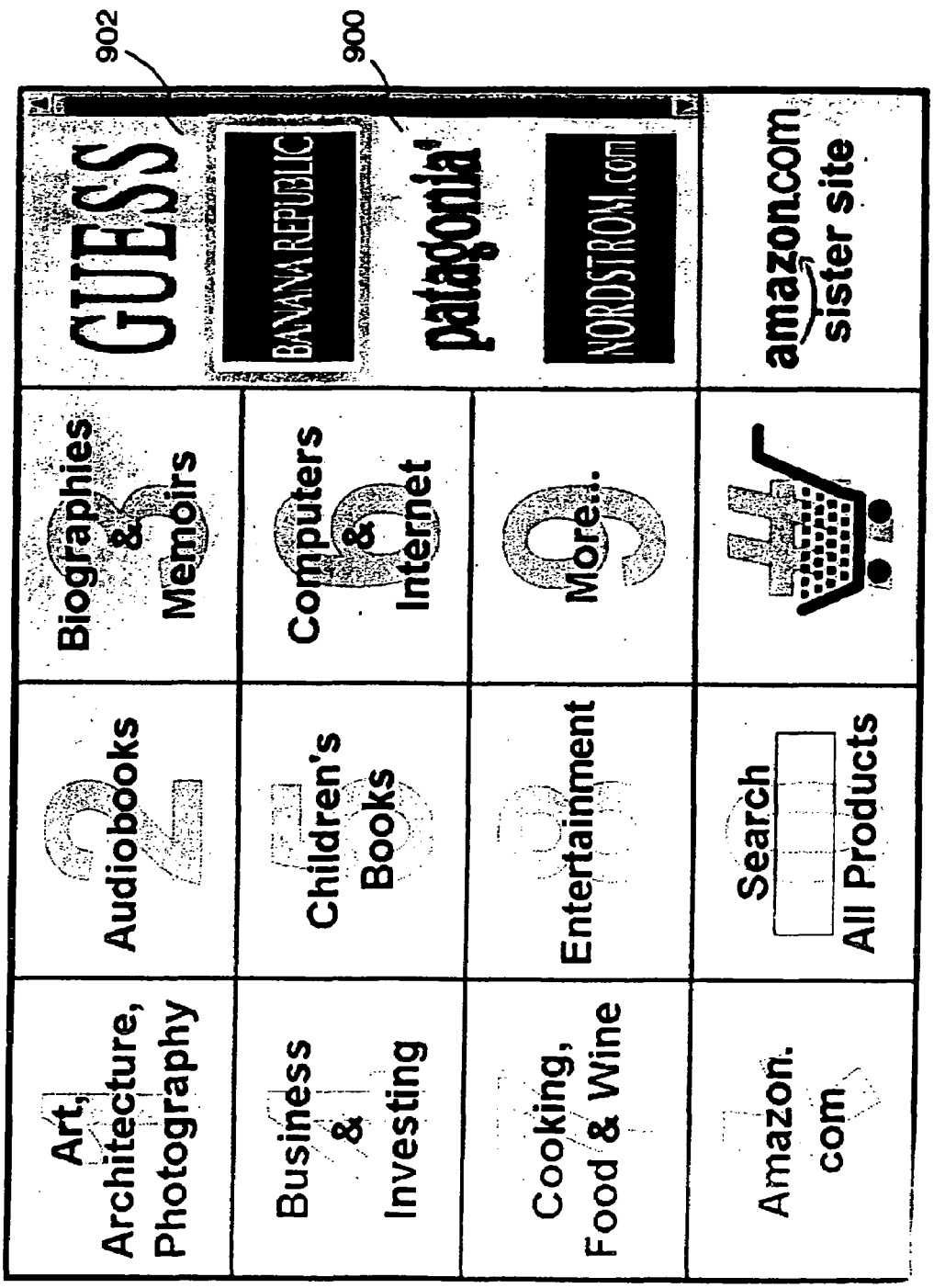
Figure 9D:
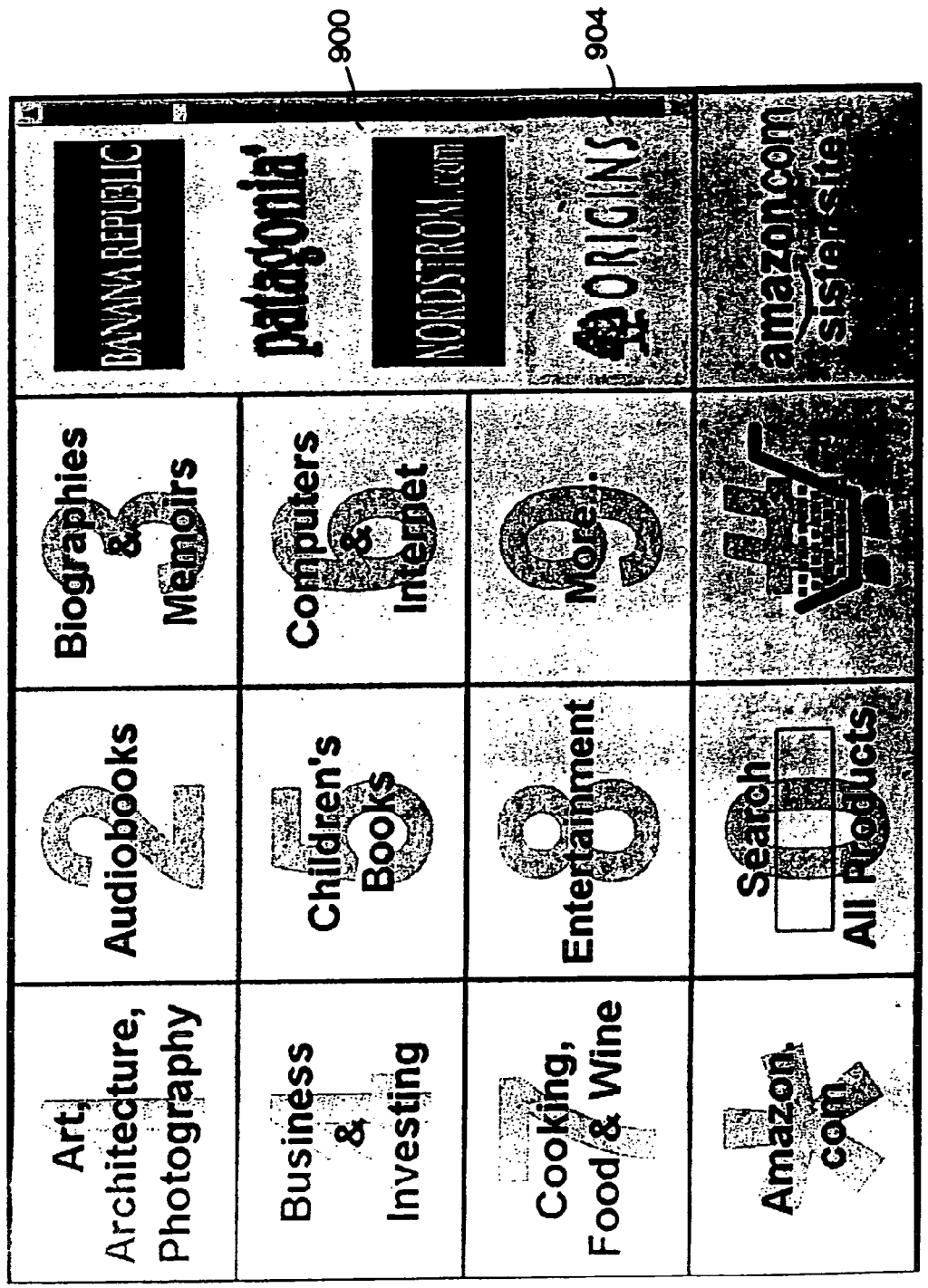

FIGS. 9*a-d* are example sister site matrix pages. In FIG. 9*a*, an advertising cell 900 is the focus region of the displayed image. Ten advertisements are displayed within the regions. The first advertisement 902 is highlighted. From this matrix page, the * returns a user to the amazon.com home page. The # reveals the contents of a user's shopping cart. In FIG. 9*b*, the contents of the focus window have been enlarged (zoomed) such that only four advertisements are displayed in ad cell 900. The no links/advertisements are highlighted. In FIG. 9*c*, advertisement 902 is again highlighted. This may occur, for example, by a user pressing a scroll key from FIG. 9*b*. In FIG. 9*d*, a user has pressed a scroll key several times from FIG. 9*c*. Thus, advertisement 902 has scrolled out of view and advertisement 904 is highlighted. While in this example, ten advertisements were present, the number of links within such a cell may be arbitrarily large. In the shown embodiment, scrolling through the links in the focus cell and scaling the focus cell content does not effect the user's view of the remaining cells.

FIGS. 10*a-g* are a series of matrix layers displayed during an exemplary navigation using one embodiment of the invention. In this example, navigation begins at the Shopping and Products matrix layer and shown in FIG. 10*a*. A selection of 5 on the 10*a* matrix layer yields an Electronics matrix layer shown in FIG. 10*b*.

Figure 10A:
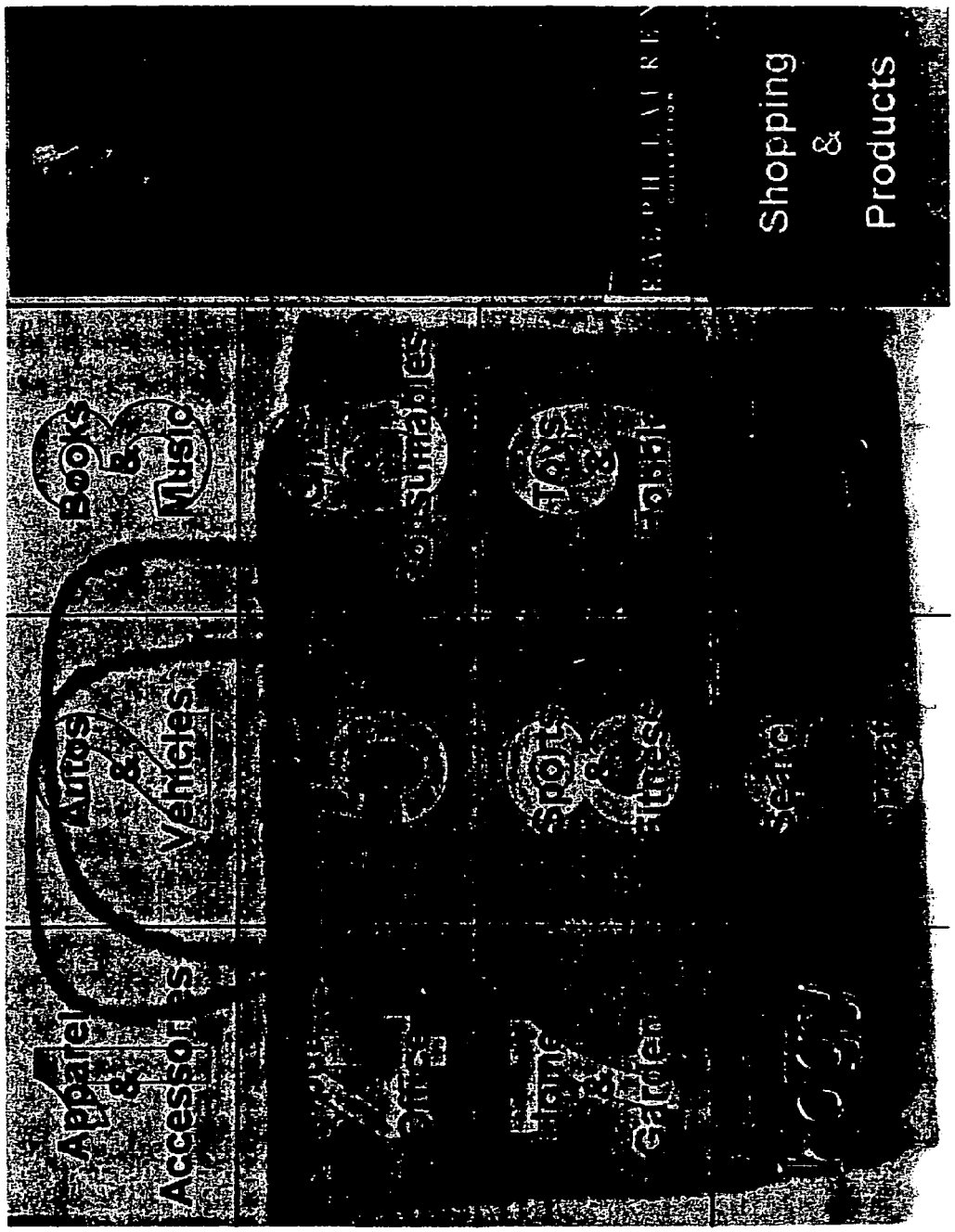
Figure 10B:
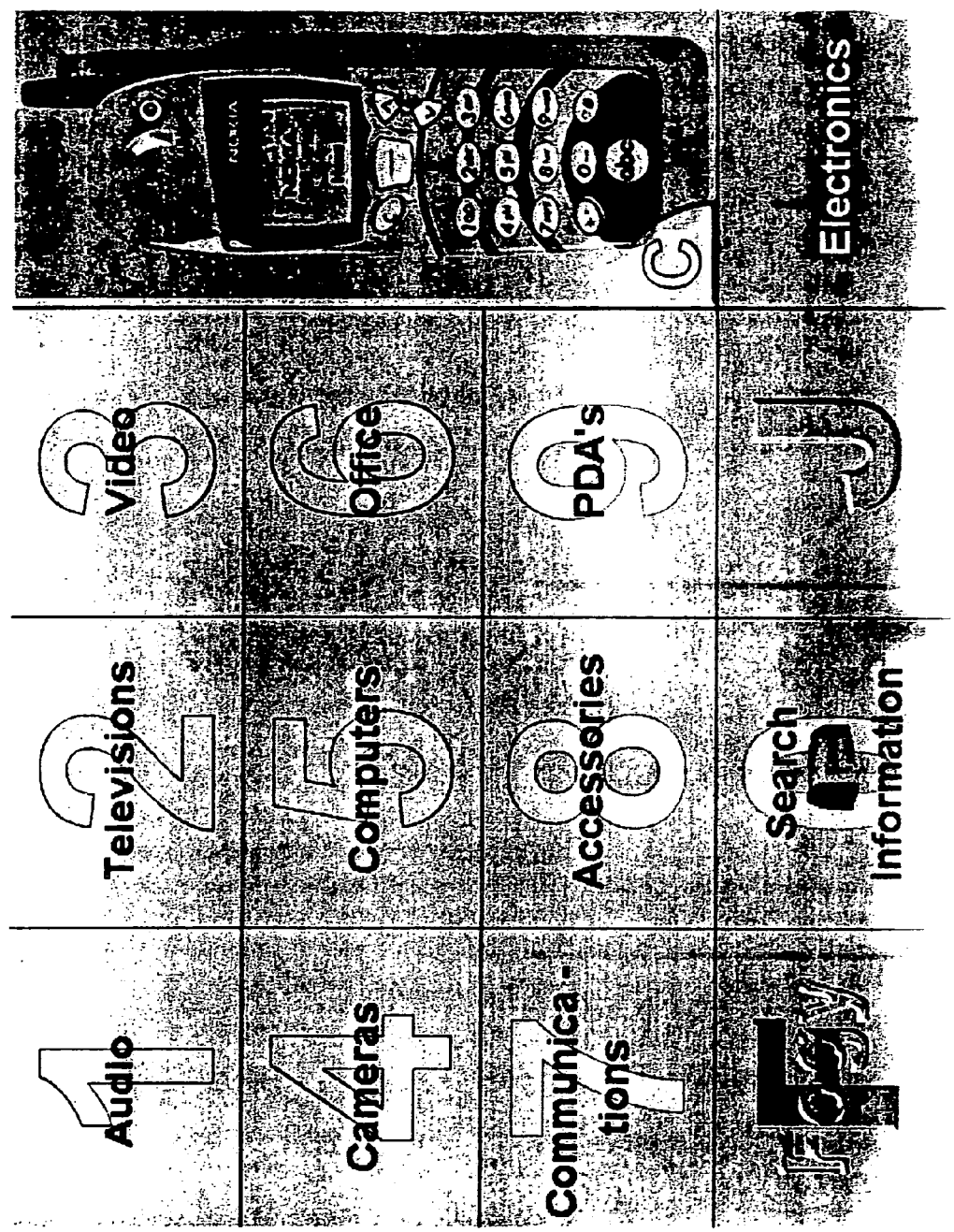
Figure 10C:
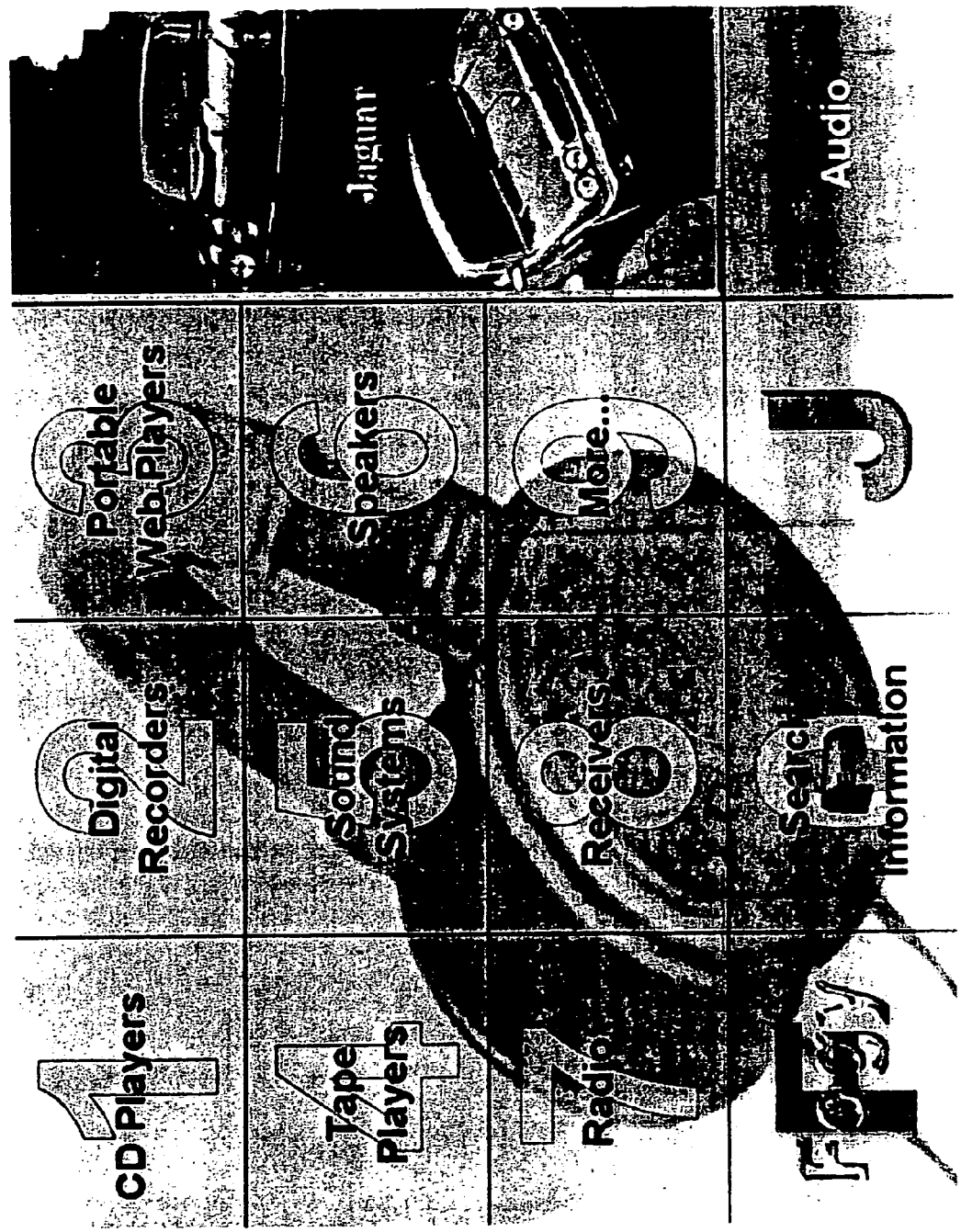
Figure 10D:
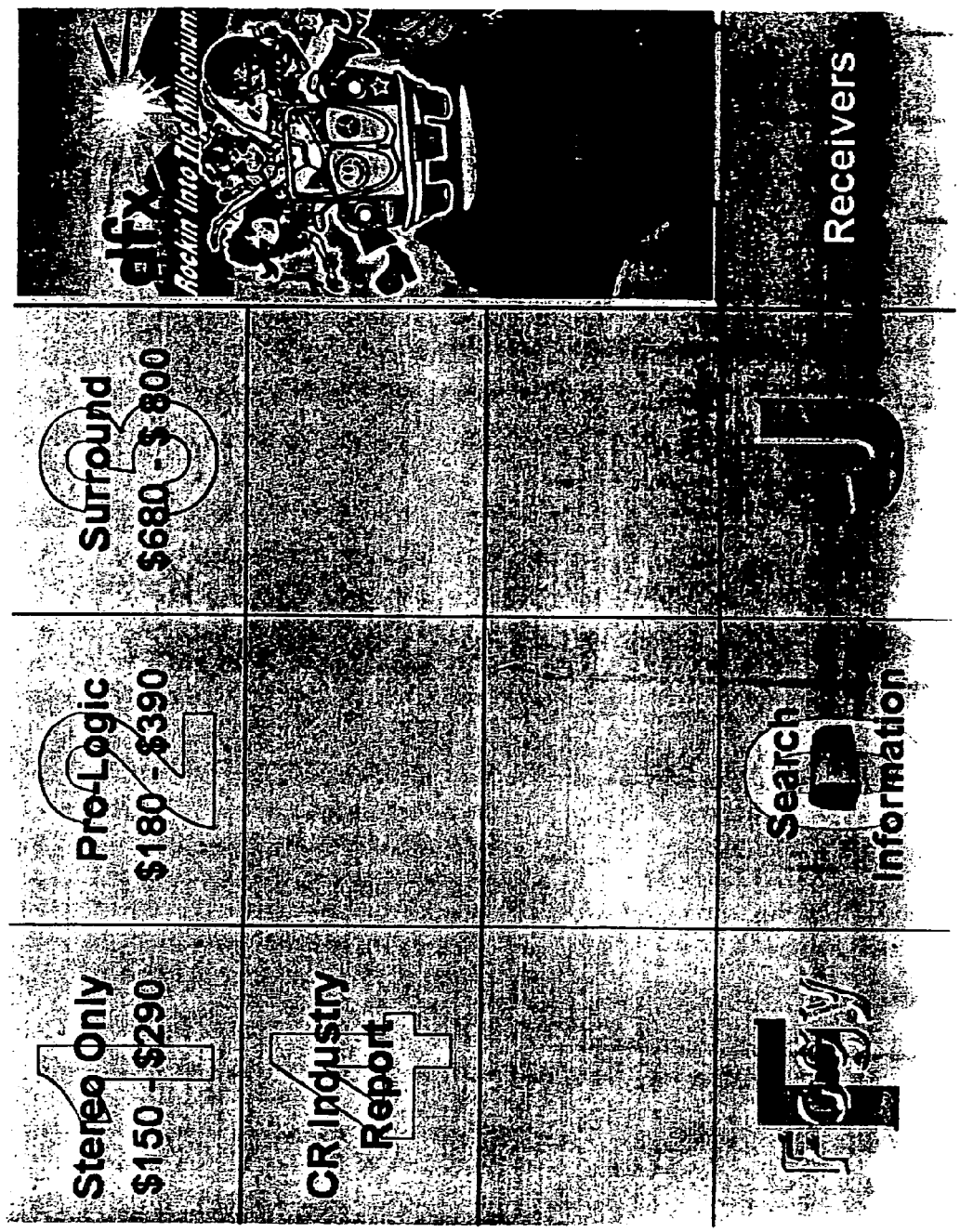
Figure 10E:
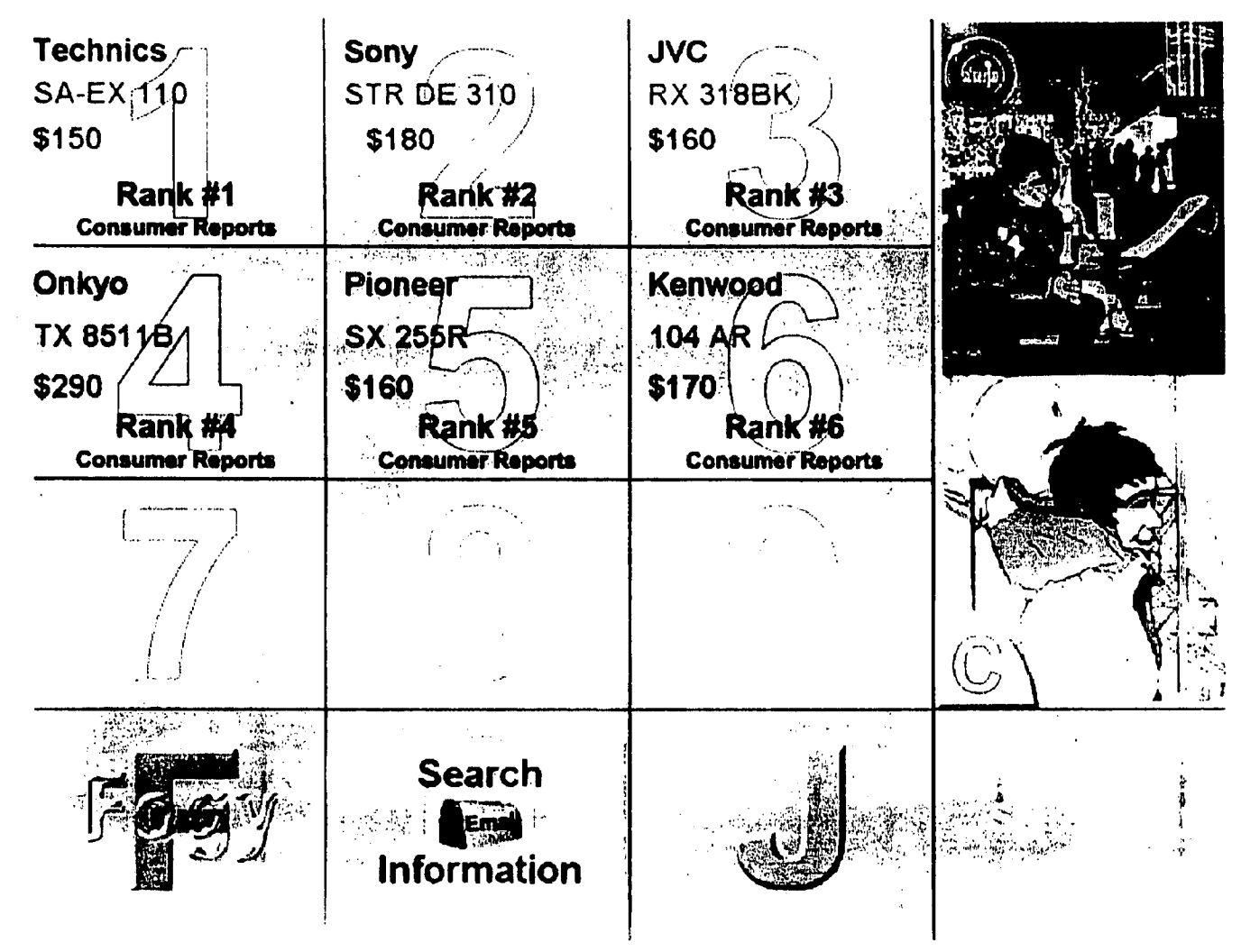
Figure 10F:
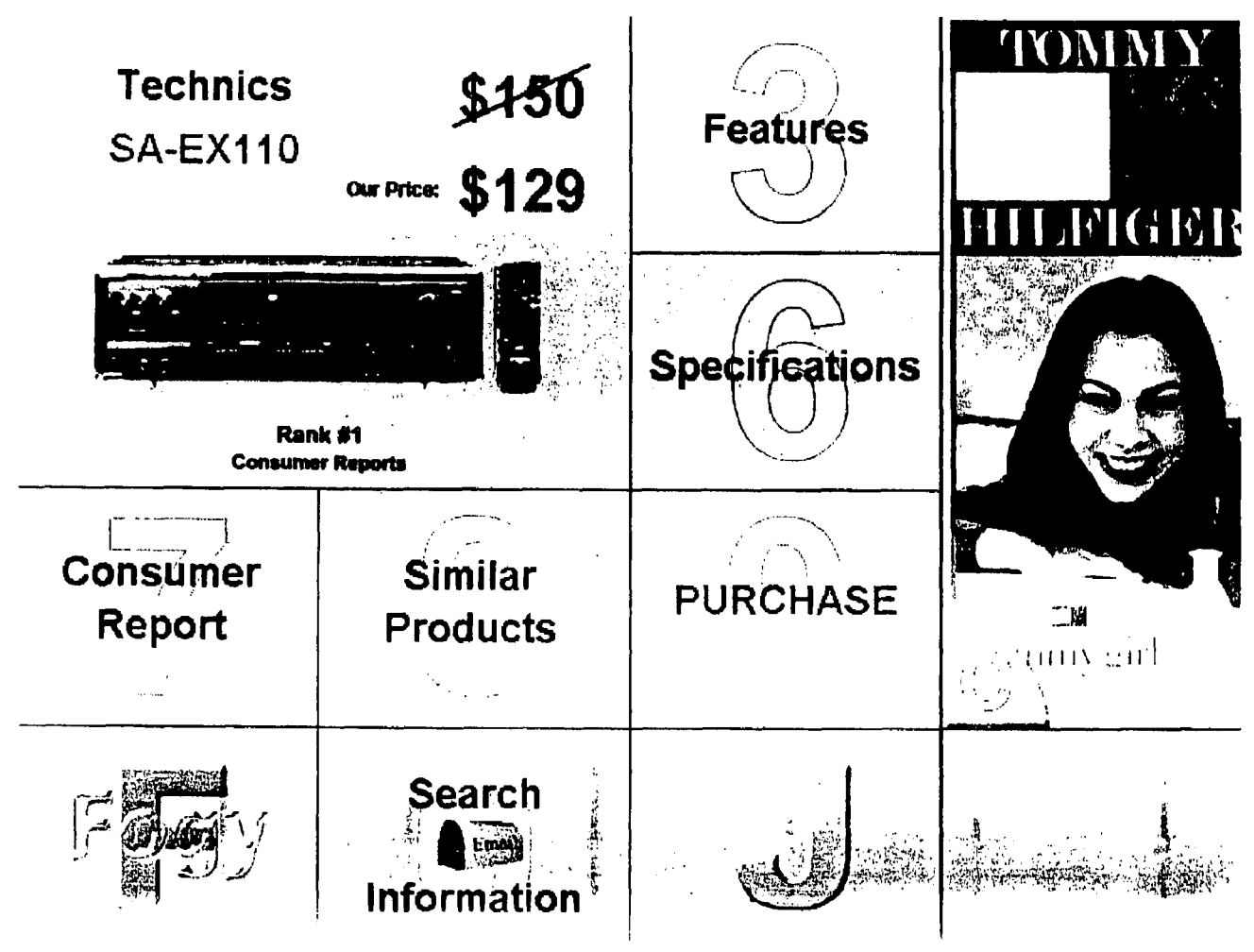
Figure 10G:
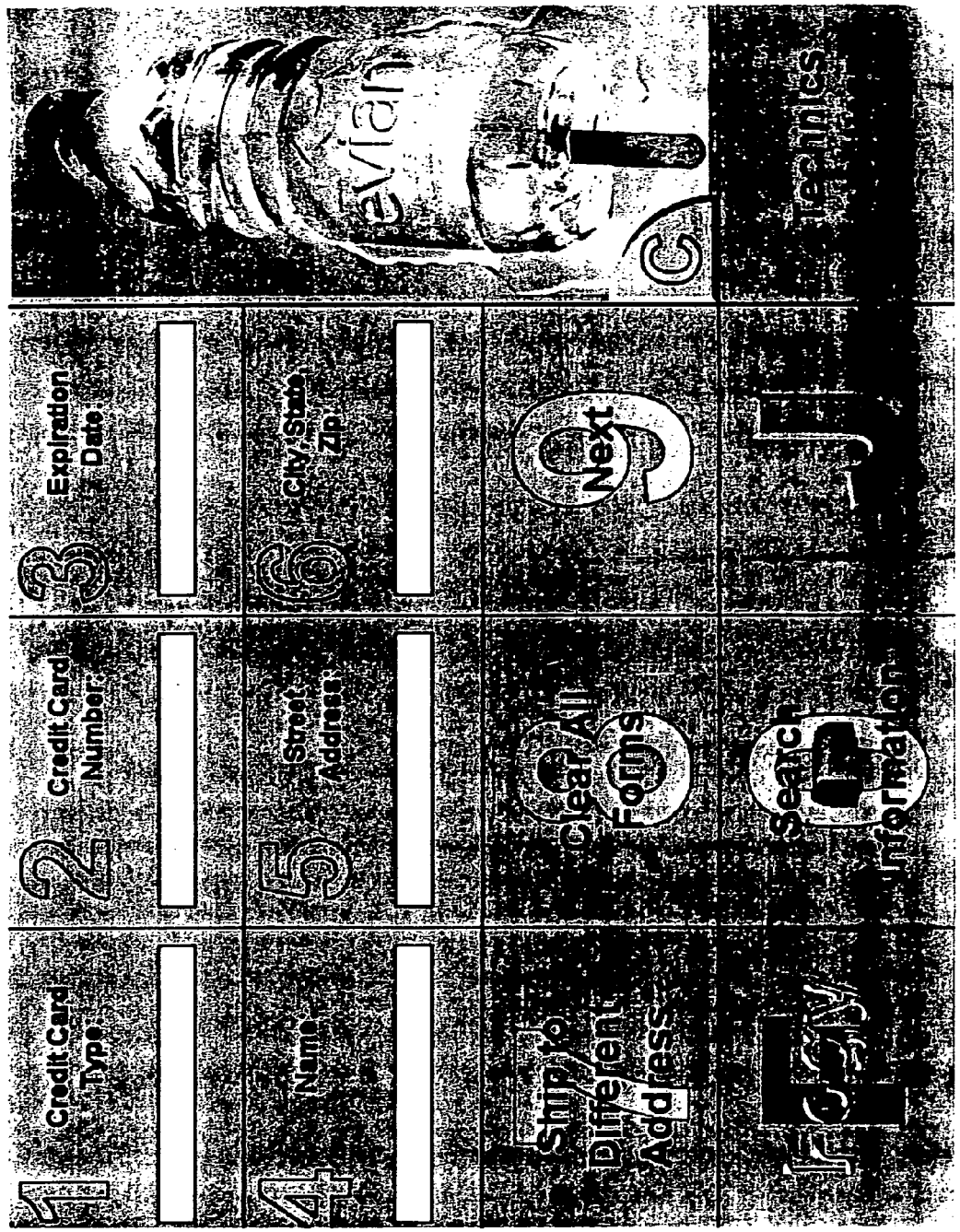

Selecting 1 on the keypad when the matrix layer of 10*b* is displayed yields the Audio matrix layer of FIG. 10*c*. By selecting an 8 on the keypad when 10*c* is displayed, the system displays a Receivers matrix layer of FIG. 10*d*, which breaks down receivers into price categories and also provides the option of navigating, in this embodiment, into Consumer Reports industry reports related to receivers. Notably, in FIG. 10*d*, the number of primary navigation options is reduced to 4. Thus, it is not necessary that all layers of the matrix have the same number of cells, nor is it required that all cells have the same size. A user can select Stereo Only by pressing 1 on the keypad, which yields a stereo only matrix layer shown in FIG. 10*e*.

In one embodiment of the invention, the products are ordered based on some ranking system, such as Consumer Reports. Thus, for example, in FIG. 10*e*, Technics received the highest ranking of receivers in the selected category from Consumer Reports. It is expected that for any particular product class, potential purchasers are likely to only be interested in the top several products within that class, not for example, the $15^{th}$ best receiver in the $150-$290 range. However, it is within the scope and contemplation of the invention to permit a "more" option which allows a user to get a set of the next most highly ranked products and possibly unranked products as well. It is expected that supplying product options in a user-friendly ranked order will encourage users to be more willing to conduct e-commerce.

By selecting a 1 on the keypad when matrix layer 10e is displayed, a user reaches the matrix layer of FIG. 10f, as well as reaching the maximum depth for that navigation path. Thus, pressing 1 on the keypad in response to matrix layer 10f does not move the user deeper into the multi-dimensional matrix, and content is displayed in cell 1 indicating the model, price, picture, and possibly other information about the Technics product. Cell 1 is also larger than the other cells.

Other navigation options are provided in additional matrix cells surrounding cell 1 and its content. The additional cells represent navigation paths that have not reached their maximum depth. For example, by pressing a 3, one would get to a features of the Technics product content layer. Such screen would display features of the Technics system. The various navigation paths typically have a maximum depth at which content is displayed. However, reaching the maximum depth of a particular navigation path does not indicate that another navigation path may not have yet a deeper matrix layer. For example, while the maximum depth of the navigation path corresponded to cell 1 has been reach in FIG. 10f, selecting a 9 on the keypad will move a user to a Technics purchase matrix layer, shown in FIG. 10g. By selecting digits on the keypad, a user can move between fields to fill out a purchase form which, as discussed above, is one example of a matrix layer including composition cells. In some embodiments, the form can be filled in using keyboard input. In other embodiments, the speech to text capabilities of the terminal will permit the user to fill out the electronic purchase form orally.

Figure 11:
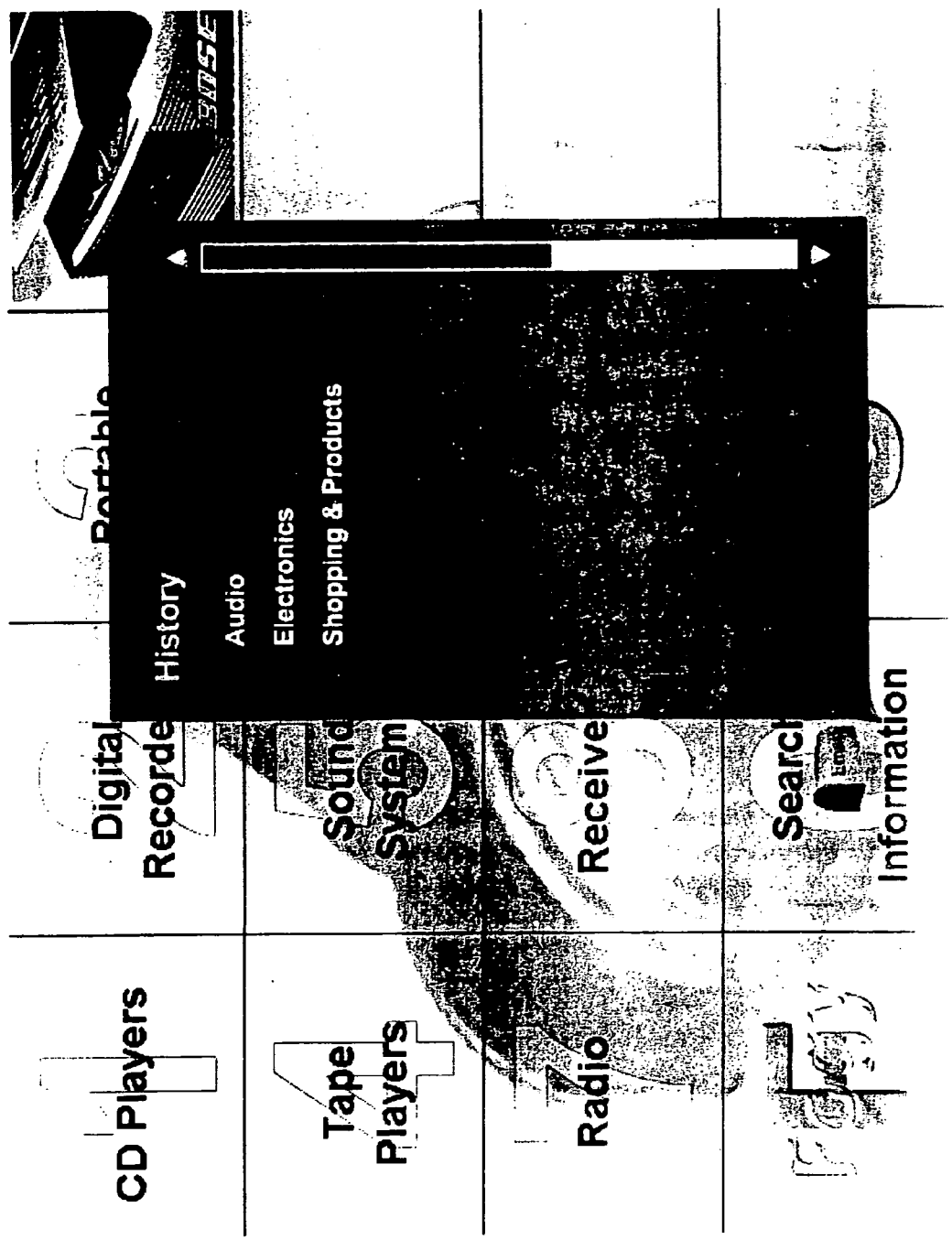
FIG. 11 shows a history window overlying a navigation matrix layer.

FIG. 11 shows a history window overlying a navigation matrix. The history window would appear if the history button on the keypad were actuated. By using the up/down arrow key on the keypad, the user may then select a prior matrix to jump to directly without moving backwards or forwards iteratively.

Figure 12A:
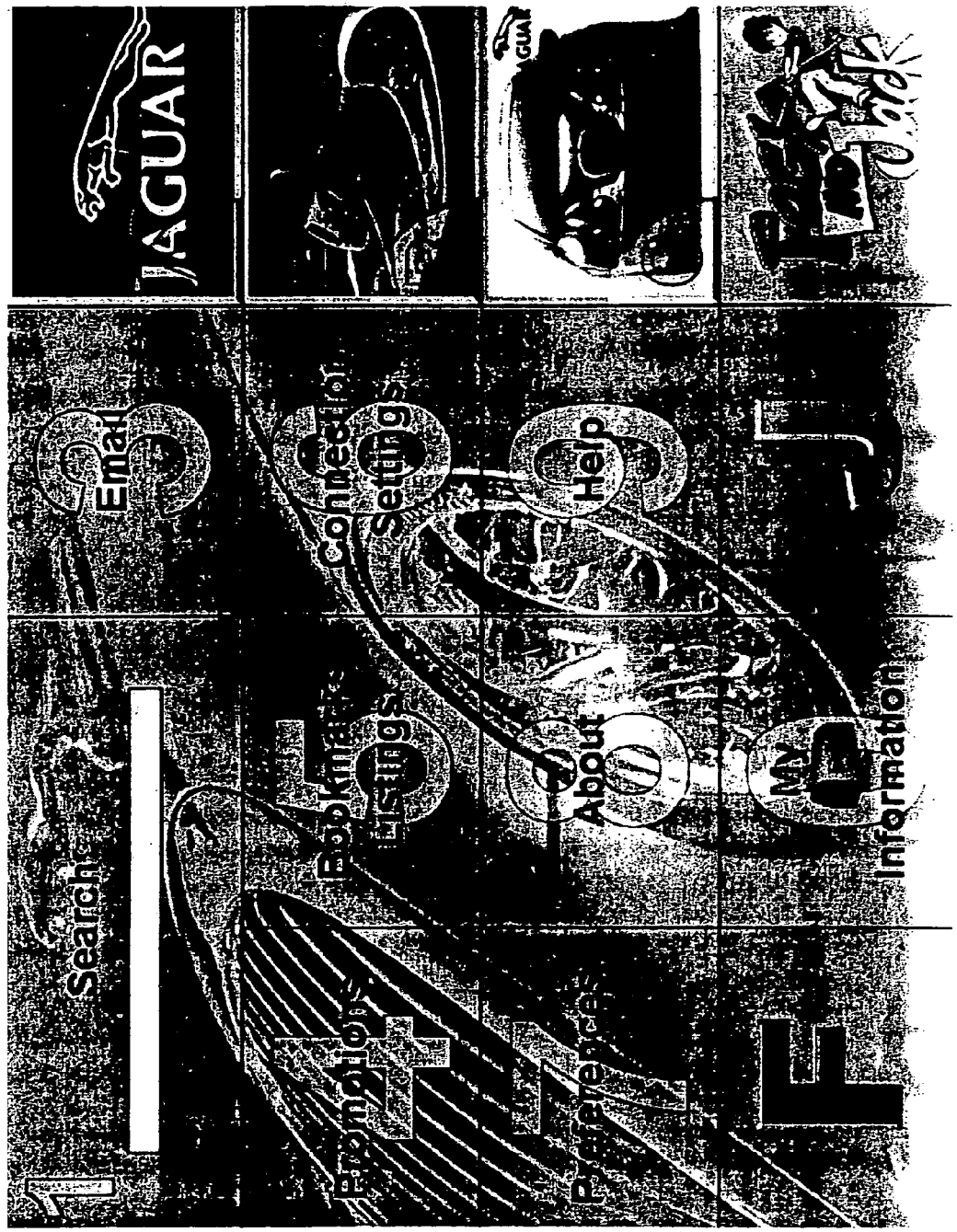
FIGS. 12a and b are an example of a matrix layer of one embodiment of the invention.
Figure 12B:
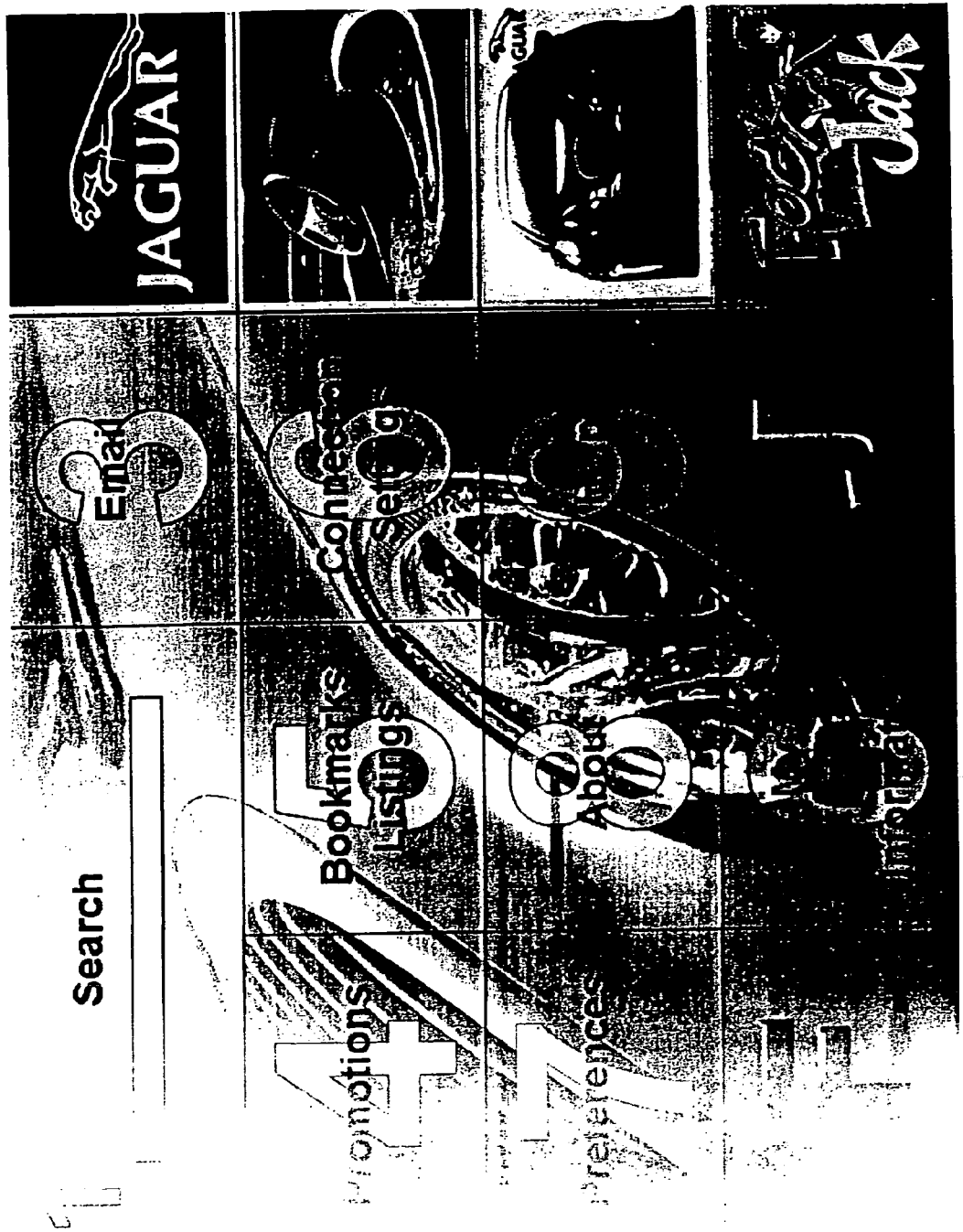

FIGS. 12a and b are an example matrix after a selection of 0 from the main menu screen, which allows one to conduct a search through cell 1. On this figure, advertisements for Jaguar appear in the ABC cells. In one embodiment of the invention, the ABC designation appears initially (as shown in FIG. 12a) when the screen is first refreshed and then fades away to reveal solely the advertisement in each of those cells (as shown in FIG. 12b). In this example, pressing an A on the keypad would take the user to a matrix reflecting company information about Jaguar. Pressing B would take the user to a matrix for the virtual showroom, and C would take the user to a purchase screen for the advertised item.

In some cases, the advertising cells are merged as a single cell showing a single advertisement and permitting navigation to only a single matrix layer therefrom. In one embodiment, the background can be an advertisement. This is also shown in FIGS. 12a and b. Significantly, the advertisement can be targeted by modifying the ad responsive to the apparent navigation path of the user. This leaves the potential of showing the user an advertisement for a product or service more likely to be of interest. For example, when a user selects Electronics in the example of FIGS. 10a-g, the next screen may have as background an advertisement, e.g. for Circuit City.

Figure 13:
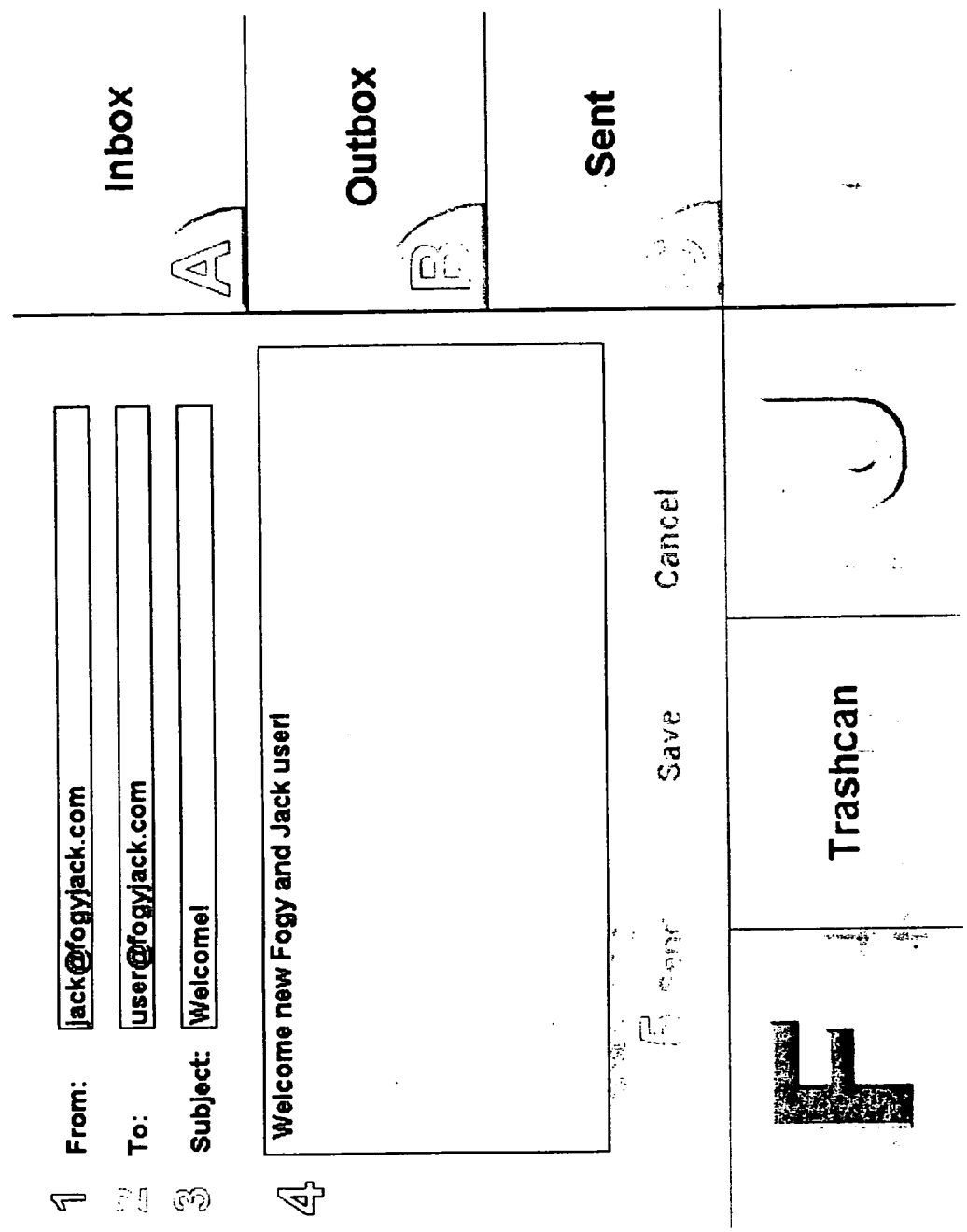
FIG. 13 is an e-mail composition matrix layer for one embodiment of the invention.

FIG. 13 shows the e-mail creation screen for one embodiment of the invention. This would be reached by pressing 3 on the keypad when the matrix layer of FIG. 9d is displayed. Again, all e-mail functions other than actually entering the text and the address can be performed using the simple interface with numerical digits and the letters ABC corresponding to inbox, the outbox, and the sent features of standard e-mail, respectively.

Figure 14:
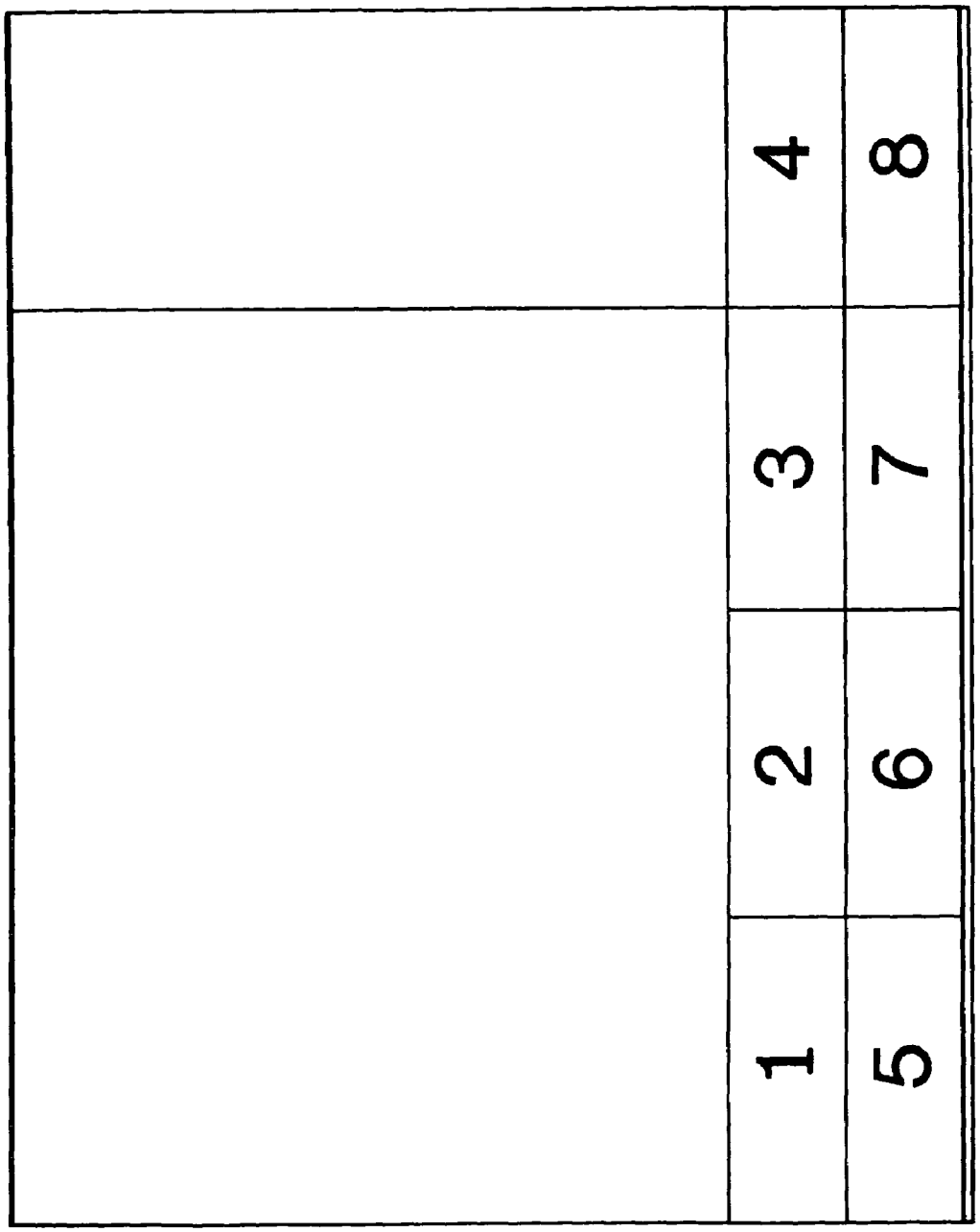
FIG. 14 shows an alternative matrix page of one embodiment of the invention.

FIG. 14 shows an alternative matrix page of one embodiment of the invention. In this embodiment, the matrix occupies only a portion of the screen real estate. The remaining real estate may be occupied by content, a zoom of the focus cell, or advertising.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed:

1. A method of navigating the Internet, comprising:
displaying on-line content accessed via the Internet, the on-line content reformatted from a webpage in a hypertext markup language (HTML) format into an extensible markup language (XML) format to generate a sister site, the sister site including a portion or a whole of content of the web page reformatted to be displayed and navigable through a simplified navigation interface on any one of a television, web appliance, console device, handheld device, wireless device or cellular phone, the simplified navigation interface displayed in a form of a two-dimensional layer of cells from a plurality of layers and a plurality of cells, the two-dimensional layer in a form of a navigation matrix, each cell is a division of a screen and exclusive to a separate single navigation option associated with a specific unique input, the on-line content formatted to be displayed in one or more of the plurality of cells and formatted to be selected for navigation by one or more of the unique inputs, navigation options to change between layers of the simplified navigation interface from general to more specific in each deeper layer;
receiving a user selection of one of the navigation options;
forwarding the selected navigation option across the internet to a server providing the simplified navigation interface;
receiving a next deeper navigation layer of the simplified navigation interface corresponding to the selected navigation option; and
manipulating a region of the screen for viewing and zooming and/or scrolling of the displayed on-line content.

2. The method of claim 1, further comprising:
displaying one or more advertisements on the screen;
receiving a user selection of a displayed advertisement; and
displaying second content accessed via the Internet,
wherein the second content is associated with the selected advertisement, and
wherein the second content accessed via the Internet is formatted for navigation with the unique inputs.

3. The method of claim 1, wherein the on-line content is selected based, at least in part, on a navigation path of a user.

4. The method of claim 1, wherein the user selection of one of the navigation options is received any one of a remote control, a pointer device, a keypad, and a keyboard.

5. The method of claim 1, wherein a wireless Internet appliance comprises a voice recognition system, the method further comprising receiving one or more navigation input selections through the voice recognition system.

6. The method of claim 1, wherein the screen includes individual regions adapted to be brought into focus and further adapted such that the on-line content can be manipulated within a selected one of the regions.

7. The method of claim 6, further comprising tabbing to focus on different one of the regions.

8. The method of claim 6, wherein the focused one of the regions is adapted to be zoomed and/or scrolled independently of other ones of the regions.

9. A method comprising:
displaying a first advertisement, the displaying of the first advertisement being via an internet and through a simplified navigation interface, the simplified navigation interface presenting advertisements and content through a plurality of layers and a plurality of cells, the simplified navigation interface displayed in a form of a two-dimensional layer of cells from the plurality of layers and the plurality of cells, the two-dimensional layer in a form of a navigation matrix, each cell in the navigation matrix associated with a specific unique input, each cell is a division of a screen and exclusive to a separate single navigation option, the first advertisement formatted for display in one of the plurality of cells and formatted to be selected for navigation by one of the unique inputs, navigation options to change between layers of the simplified navigation interface from general to more specific in each deeper layer;
displaying a first content via the internet and through the simplified navigation interface, the first content displayed in one or more of the plurality of cells, the first content reformatted from a web page in a hypertext markup language (HTML) format into an extensible markup language (XML) format to generate a sister site to be displayed and navigable through the simplified navigation interface, the sister site including a portion or a whole of content of the web page reformatted to be navigable by unique inputs through the simplified navigation interface on any one of a television, web appliance, console device, handheld device, wireless device or cellular phone;
receiving a first input, the first input received as the specific unique input that is uniquely coupled with an associated cell in the navigation matrix;
forwarding the first input across the internet to a server providing the simplified navigation interface;
receiving a next deeper navigation layer of the simplified navigation interface in response to receiving the first input; and
manipulating a selected region of the screen for viewing and zooming and/or scrolling of the displayed on-line content.

10. The method of claim 9, further comprising:
customizing the display of the simplified navigation interface based on a navigation path of the user.

11. The method of claim 9, wherein the first input selects a primary navigation option.

12. The method of claim 9, further comprising:
displaying the first content simultaneous with the first advertisement.

13. The method of claim 9, wherein the first input is received from any one of a remote control, a pointer device, a keypad, and a keyboard.

14. The method of claim 9, further comprising:
displaying a second advertisement in the simplified navigation interface, the second advertisement not displayed in a cell or matrix.

15. The method of claim 14, further comprising:
displaying the simplified navigation interface as an overlay over the second advertisement.

16. The method of claim 9, wherein the first content includes one or more of audio content and video content from the web page.

17. The method of claim 9, further comprising:
receiving navigation input selections for the simplified navigation interface from a voice recognition system.

18. The method of claim 9, further comprising:
maintaining a database of sister site web pages by a content partner.

19. The method of claim 9, further comprising:
accepting an alphanumeric value as the first input to indicate selection of a corresponding first cell, the first cell including a display of the alphanumeric value.

20. The method of claim 9, wherein the simplified navigation interface includes a search form.

21. The method of claim 9, wherein the simplified navigation interface includes an email form.

22. The method of claim 9, further comprising:
displaying a purchasing interface in response to receiving the first input.

23. The method of claim 9, wherein the simplified navigation interface is not presented through a standard web browser.

24. The method of claim 9, further comprising:
displaying a third advertisement embedded within the on-line content, the third advertisement corresponding to a third navigation option.

25. A machine readable medium having instructions stored therein, which when executed cause a machine to perform a set of operations comprising:
displaying a first advertisement, the displaying of the first advertisement being via an internet and through a simplified navigation interface, the simplified navigation interface presenting advertisements and content through a plurality of layers and a plurality of cells, the simplified navigation interface displayed in a form of a two-dimensional layer of cells from the plurality of layers and the plurality of cells, the two-dimensional layer in a form of a navigation matrix, each cell in the navigation matrix associated with a specific unique input, each cell is a division of a screen and exclusive to a separate single navigation option, the first advertisement formatted for display in one of the plurality of cells and formatted to be selected for navigation by one of the unique inputs, navigation options to change between layers of the simplified navigation interface from general to more specific in each deeper layer;
displaying a first content via the internet and through the simplified navigation interface, the first content displayed in one or more of the plurality of cells, the first content reformatted from a web page in a hypertext markup language (HTML) format into an extensible markup language (XML) format to generate a sister site to be displayed and navigable through the simplified navigation interface, the sister site including a portion or a whole of content of the web page reformatted to be navigable by unique inputs through the simplified navigation interface on any one of a television, web appliance, console device, handheld device, wireless device or cellular phone;
receiving a first input, the first input received as the specific unique input that is uniquely coupled with an associated cell in the navigation matrix;

forwarding the first input across the internet to a server providing the simplified navigation interface;

receiving a next deeper navigation layer of the simplified navigation interface in response to receiving the first input; and manipulating a selected region of the screen for viewing and zooming and/or scrolling of the displayed on-line content.

26. The machine readable medium of claim 25, having further instructions stored therein, which when executed cause the machine to perform further operations, comprising:
customizing the display of the simplified navigation interface based on a navigation path of the user.

27. The machine readable medium of claim 25, wherein the first input selects a primary navigation option.

28. The machine readable medium of claim 25, having further instructions stored therein, which when executed cause the machine to perform further operations, comprising:
displaying the first content simultaneous with the first advertisement.

29. The machine readable medium of claim 25, wherein the first input is received from any one of a remote control, a pointer device, a keypad, and a keyboard.

30. The machine readable medium of claim 25, having further instructions stored therein, which when executed cause the machine to perform further operations, comprising:
displaying a second advertisement in the simplified navigation interface, the second advertisement not displayed in a cell or matrix.

31. The machine readable medium of claim 30, having further instructions stored therein, which when executed cause the machine to perform further operations, comprising:
displaying the simplified navigation interface as an overlay over the second advertisement.

32. The machine readable medium of claim 25, wherein the first content includes one or more of audio content and video content from the web page.

33. The machine readable medium of claim 25, having further instructions stored therein, which when executed cause the machine to perform further operations, comprising:
receiving navigation input selections for the simplified navigation interface from a voice recognition system.

34. The machine readable medium of claim 25, the machine readable medium further comprising:
accepting an alphanumeric value as the first input to indicate selection of a corresponding first cell, the first cell including a display of the alphanumeric value.

35. The machine readable medium of claim 25, wherein the simplified navigation interface includes a search form.

36. The machine readable medium of claim 25, wherein the simplified navigation interface includes an email form.

37. The machine readable medium of claim 25, having further instructions stored therein, which when executed cause the machine to perform further operations, comprising:
displaying a purchasing interface in response to receiving the first input.

38. The machine readable medium of claim 25, wherein the simplified navigation interface is not presented through a standard web browser.

39. The machine readable medium of claim 25, having further instructions stored therein, which when executed cause the machine to perform further operations, comprising:
displaying a third advertisement embedded within the on-line content, the third advertisement corresponding to a third navigation option.

40. The method of claim 1, wherein at least some of the plurality of cells correspond to primary navigation options.

41. The method of claim 1, further comprising using a pointer device to select one or more of the plurality of cells and/or to manipulate the screen.

42. The method of claim 1, further comprising:
maintaining a database of sister site webpages by a content partner.

43. The method of claim 1, further comprising:
displaying the on-line content concurrently with one or more advertisements.

44. The method of claim 43, further comprising:
displaying the simplified navigation interface as an overlay over the one or more advertisements.

45. The method of claim 1, further comprising:
accepting an alphanumeric value as the user selection of the first navigation option, the first navigation option corresponding to a cell including a display of the alphanumeric value.

46. The method of claim 1, wherein the simplified navigation interface includes a search form.

47. The method of claim 1, wherein the simplified navigation interface includes an email form.

48. The method of claim 1, further comprising:
displaying a purchasing interface in response to receiving the first navigation option.

49. The method of claim 1, wherein the simplified navigation interface is not presented through a standard web browser.

50. The method of claim 9, wherein the screen includes individual regions adapted to be brought into focus and further adapted such that the on-line content can be manipulated within a selected one of the regions.

51. The method of claim 50, further comprising tabbing to focus on different one of the regions.

52. The method of claim 50, wherein the focused one of the regions is adapted to be zoomed and/or scrolled independently of other ones of the regions.

53. The method of claim 9, further comprising using a pointer device to select one or more of the plurality of cells and/or to manipulate the screen.

54. The machine readable medium of claim 25, wherein the screen includes individual regions adapted to be brought into focus and further adapted such that the on-line content can be manipulated within a selected one of the regions.

55. The machine readable medium of claim 54, having further instructions stored therein, which when executed cause the machine to perform further operations, comprising:
tabbing to focus on different one of the regions.

56. The machine readable medium of claim 54, wherein the focused one of the regions is adapted to be zoomed and/or scrolled independently of other ones of the regions.

57. The machine readable medium of claim 25, having further instructions stored therein, which when executed cause the machine to perform further operations, comprising:
using a pointer device to select one or more of the plurality of cells and/or to manipulate the screen.

58. A machine readable medium having instructions stored therein, which when executed cause a machine to perform a set of operations comprising:
displaying on-line content accessed via the Internet, the on-line content reformatted from a webpage in a hypertext markup language (HTML) format into an extensible markup language (XML) format to generate a sister site, the sister site including a portion or a whole of content of the web page reformatted to be displayed and navigable through a simplified navigation interface on any one of a television, web appliance, console device, handheld device, wireless device or cellular phone, the simplified navigation interface displayed in a form of a two-dimensional layer of cells from a plurality of layers and a plurality of cells, the two-dimensional layer in a form of a navigation matrix, each cell is a division of a screen and exclusive to a separate single navigation option associated with a specific unique input, the on-line content formatted to be displayed in one or more of the plurality of cells and formatted to be selected for navigation by one or more of the unique inputs, navigation options to change between layers of the simplified navigation interface from general to more specific in each deeper layer;

receiving a user selection of one of the navigation options;

forwarding the selected navigation option across the internet to a server providing the simplified navigation interface;

receiving a next deeper navigation layer of the simplified navigation interface corresponding to the selected navigation option; and manipulating a region of the screen for viewing and zooming and/or scrolling of the displayed on-line content.

59. The machine readable medium of claim 58, having further instructions stored therein, which when executed cause the machine to perform further operations, comprising:
displaying one or more advertisements on the screen;
receiving a user selection of a displayed advertisement; and
displaying second content accessed via the Internet,
wherein the second content is associated with the selected advertisement, and
wherein the second content accessed via the Internet is formatted for navigation with the unique inputs.

60. The machine readable medium of claim 58, wherein the on-line content is selected based, at least in part, on a navigation path of a user.

61. The machine readable medium of claim 58, wherein the user selection of one of the navigation options is received from any one of a remote control, a pointer device, a keypad, and a keyboard.

62. The machine readable medium of claim 58, having further instructions stored therein, which when executed cause the machine to perform further operations, comprising:
receiving one or more navigation input selections through a voice recognition system.

63. The machine readable medium of claim 58, wherein the screen includes individual regions adapted to be brought into focus and further adapted such that the on-line content can be manipulated within a selected one of the regions.

64. The machine readable medium of claim 63, having further instructions stored therein, which when executed cause the machine to perform further operations, comprising:
tabbing to focus on different one of the regions.

65. The machine readable medium of claim 63, wherein the focused one of the regions is adapted to be zoomed and/or scrolled independently of other ones of the regions.

66. The machine readable medium of claim 58, wherein at least some of the plurality of cells correspond to primary navigation options.

67. The machine readable medium of claim 58, having further instructions stored therein, which when executed cause the machine to perform further operations, comprising:
using a pointer device to select one or more of the plurality of cells and/or to manipulate the screen.

68. The machine readable medium of claim 58, having further instructions stored therein, which when executed cause the machine to perform further operations, comprising:
displaying the on-line content concurrently with one or more advertisements.

69. The machine readable medium of claim 68, having further instructions stored therein, which when executed cause the machine to perform further operations, comprising:
displaying the simplified navigation interface as an overlay over the one or more advertisements.

70. The machine readable medium of claim 58, the machine readable medium further comprising:
accepting an alphanumeric value to indicate selection of the first navigation option, the first navigation option corresponding to a cell including a display of the alphanumeric value.

71. The machine readable medium of claim 58, wherein the simplified navigation interface includes a search form.

72. The machine readable medium of claim 58, wherein the simplified navigation interface includes an email form.

73. The machine readable medium of claim 58, having further instructions stored therein, which when executed cause the machine to perform further operations, comprising:
displaying a purchasing interface in response to receiving the selection of the first navigation option.

74. The machine readable medium of claim 58, wherein the simplified navigation interface is not presented through a standard web browser.

75. The method of claim 1, wherein the on-line content includes one or more of audio content and video content from the web page.

76. The machine readable medium of claim 58, wherein the on-line content includes one or more of audio content and video content from the web page.

* * * * *

UNITED STATES PATENT AND TRADEMARK OFFICE
CERTIFICATE OF CORRECTION

PATENT NO.         : 7,441,196 B2
APPLICATION NO.    : 11/373324
DATED              : October 21, 2008
INVENTOR(S)        : Gottfurcht et al.

It is certified that error appears in the above-identified patent and that said Letters Patent is hereby corrected as shown below:

Page 3, Column 1 add the following references:
3,586,771 6/1971 Hamburger
4,650,977 3/1987 Couch
4,706,121 11/1987 Young
4,992,940 2/1991 Dworkin Page 3, Column 1 replace "2002/0035174 A1 3/2002 Alpdemir"
  with -- 2002/0035474 A1 3/2002 Alpdemir--

Page 3, Column 2 add the following Foreign Patent Document:
CA CA2,001,263 4/1990 McCalley Column 10, line 62 replace "received any one" with --received from any one--

Signed and Sealed this

Ninth Day of December, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,441,196 B2 |
| APPLICATION NO. | : 11/373324 |
| DATED | : October 21, 2008 |
| INVENTOR(S) | : Gottfurcht et al. |

Page 1 of 1

It is certified that error appears in the above-identified patent and that said Letters Patent is hereby corrected as shown below:

Column 10, line 62 replace "received any one" with --received from any one--

Signed and Sealed this

Sixteenth Day of December, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,441,196 B2 |
| APPLICATION NO. | : 11/373324 |
| DATED | : October 21, 2008 |
| INVENTOR(S) | : Gottfurcht et al. |

It is certified that error appears in the above-identified patent and that said Letters Patent is hereby corrected as shown below:

Title Pg, Item (56)
Page 3, Column 1 add the following references:
3,586,771 6/1971 Hamburger
4,650,977 3/1987 Couch
4,706,121 11/1987 Young
4,992,940 2/1991 Dworkin Title Pg, Item (56)
Page 3, Column 1 replace "2002/0035174 A1 3/2002 Alpdemir"
   with --2002/0035474 A1 3/2002 Alpdemir--

Title Pg, Item (56)
Page 3, Column 2 add the following Foreign Patent Document:
CA CA2,001,263 4/1990 McCalley Signed and Sealed this Thirtieth Day of December, 2008

JON W. DUDAS
*Director of the United States Patent and Trademark Office*

(12) INTER PARTES REEXAMINATION CERTIFICATE (0299th)
United States Patent
Gottfurcht et al.

(10) Number: US 7,441,196 C1
(45) Certificate Issued: Sep. 6, 2011

(54) APPARATUS AND METHOD OF MANIPULATING A REGION ON A WIRELESS DEVICE SCREEN FOR VIEWING, ZOOMING AND SCROLLING INTERNET CONTENT

(75) Inventors: Elliot A. Gottfurcht, Pacific Palisades, CA (US); Grant E. Gottfurcht, Pacific Palisades, CA (US); Albert-Michel C. Long, Irvine, CA (US)

(73) Assignee: EMG Technology, LLC, Woodland Hills, CA (US)

Reexamination Request:
No. 95/001,286, Dec. 21, 2009

Reexamination Certificate for:
Patent No.: 7,441,196
Issued: Oct. 21, 2008
Appl. No.: 11/373,324
Filed: Mar. 13, 2006

Certificate of Correction issued Dec. 9, 2008.

Certificate of Correction issued Dec. 30, 2008.

Certificate of Correction issued Dec. 16, 2008.

Related U.S. Application Data

(63) Continuation of application No. 09/518,015, filed on Mar. 3, 2000, now Pat. No. 7,020,845, which is a continuation-in-part of application No. 09/440,214, filed on Nov. 15, 1999, now Pat. No. 6,600,497.

(51) Int. Cl.
*G06F 3/00* (2006.01)

(52) U.S. Cl. .................. 715/740; 715/730; 715/760
(58) Field of Classification Search .................. None
See application file for complete search history.

(56) References Cited

U.S. PATENT DOCUMENTS

| | | |
|---|---|---|
| 5,119,079 A | 6/1992 | Hube et al. |
| 5,481,296 A | 1/1996 | Cragun et al. |
| 5,524,195 A | 6/1996 | Clanton, III et al. |
| 5,594,509 A | 1/1997 | Florin et al. |
| 5,602,596 A | 2/1997 | Claussen et al. |
| 5,615,384 A | 3/1997 | Allard et al. |
| 5,621,456 A | 4/1997 | Florin et al. |
| 5,689,669 A | 11/1997 | Lynch et al. |
| 5,745,909 A | 4/1998 | Perlman et al. |
| 5,809,415 A | 9/1998 | Rossmann |
| 5,815,142 A | 9/1998 | Allard et al. |
| 5,862,220 A | 1/1999 | Perlman |
| 5,890,175 A | 3/1999 | Wong et al. |
| 5,914,941 A | 6/1999 | Janky |

(Continued)

FOREIGN PATENT DOCUMENTS

| | | |
|---|---|---|
| EP | 0 811 939 | 10/1997 |
| EP | 0 932 979 | 12/2007 |
| GB | 2 329 309 | 3/1999 |
| GB | 2 344 197 | 5/2000 |
| JP | 9 -9160 | 1/1997 |
| JP | 9 -288674 | 11/1997 |
| JP | 11-096237 | 4/1999 |
| JP | 11 -328218 | 11/1999 |
| JP | 2000-67035 | 3/2000 |
| WO | WO 97/02537 | 1/1997 |
| WO | 98/17064 | 4/1998 |
| WO | 99/52032 | 10/1999 |
| WO | 99/57657 | 11/1999 |
| WO | 00/39666 | 7/2000 |

OTHER PUBLICATIONS

Vind, O.; Make Your Web Site with an HTML; Jan. 2000; pp. 40–43.

(Continued)

*Primary Examiner* — Andrew Nalven

(57) ABSTRACT

A method and apparatus of simplified navigation. A web page is provided having a link to a sister site. The sister site facilitates simplified navigation. Pages from the sister site are served responsive to actuation of the sister site link. In one embodiment, the sister site includes matrix pages to permit matrix navigation.

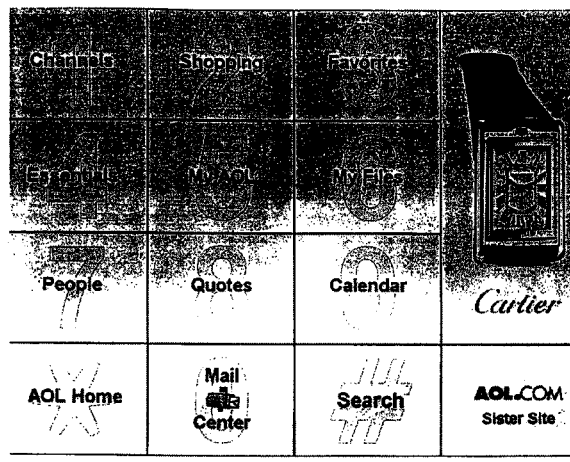

U.S. PATENT DOCUMENTS

| | | | |
|---|---|---|---|
| 5,918,013 | A | 6/1999 | Mighdoll et al. |
| 5,945,991 | A | 8/1999 | Britt et al. |
| 5,978,381 | A | 11/1999 | Perlman et al. |
| 5,996,022 | A | 11/1999 | Krueger et al. |
| 6,002,395 | A | 12/1999 | Wagner et al. |
| 6,034,689 | A | 3/2000 | White et al. |
| 6,076,109 | A | 6/2000 | Kikinis |
| 6,144,962 | A | 11/2000 | Weinberg et al. |
| 6,167,409 | A | 12/2000 | DeRose et al. |
| 6,182,072 | B1 | 1/2001 | Leak et al. |
| 6,209,009 | B1 | 3/2001 | Schwartz et al. |
| 6,211,856 | B1 | 4/2001 | Choi et al. |
| 6,226,642 | B1 | 5/2001 | Beranek et al. |
| 6,243,724 | B1 | 6/2001 | Mander et al. |
| 6,247,048 | B1 | 6/2001 | Greer et al. |
| 6,249,844 | B1 | 6/2001 | Schloss et al. |
| 6,289,464 | B1 | 9/2001 | Wecker et al. |
| 6,300,947 | B1 | 10/2001 | Kanevsky |
| 6,311,058 | B1 | 10/2001 | Wecker et al. |
| 6,311,197 | B2 | 10/2001 | Mighdoll et al. |
| 6,336,123 | B2 | 1/2002 | Inoue et al. |
| 6,339,780 | B1 | 1/2002 | Shell et al. |
| 6,344,861 | B1 | 2/2002 | Naughton et al. |
| 6,359,633 | B1 | 3/2002 | Balasubramaniam et al. |
| 6,370,537 | B1 | 4/2002 | Gilbert et al. |
| 6,392,664 | B1 | 5/2002 | White et al. |
| 6,401,132 | B1 | 6/2002 | Bellwood et al. |
| 6,417,873 | B1 | 7/2002 | Fletcher et al. |
| 6,430,624 | B1 | 8/2002 | Jamtgaard et al. |
| 6,449,638 | B1 | 9/2002 | Wecker et al. |
| 6,473,609 | B1 | 10/2002 | Schwartz et al. |
| 6,493,758 | B1 | 12/2002 | McLain |
| 6,496,842 | B1 | 12/2002 | Lyness |
| 6,535,896 | B2 | 3/2003 | Britton et al. |
| 6,675,351 | B1 | 1/2004 | Leduc |
| 6,763,460 | B1 | 7/2004 | Hild et al. |
| 6,772,201 | B2 | 8/2004 | Simmon et al. |
| 6,857,102 | B1 | 2/2005 | Bickmore et al. |
| 6,886,013 | B1 | 4/2005 | Beranek |
| 6,925,595 | B1 | 8/2005 | Whitledge et al. |
| 6,938,073 | B1 | 8/2005 | Mendhekar et al. |
| 7,334,192 | B2 | 2/2008 | Mugura et al. |
| 2002/0059344 | A1 | 5/2002 | Britton et al. |
| 2002/0194130 | A1 | 12/2002 | Maegawa et al. |

OTHER PUBLICATIONS

Article—Instant Mobilizer—Turn Your Website into an Instant Mobilizer; Apr. 1, 2009; pp. 1–2.

Article—Instant Mobilizer—How it Works; Apr. 1, 2009; pp. 1–2.

Article—Instant Mobilizer—Delivering Mobile to the Internet; 1 Pg.

Myers, B., et al.; Past, Present, and Future of User Interface Software Tools, ACM Transactions on Computer–Human Interaction, vol. 7, No. 1., Mar. 2000, pp. 3–28.

Bharadvaj, H., et al.; An Active Transcoding Proxy to Support Mobile Web Access, 6 Pgs.

Hori, M., et al.; W3C—External Annotation of Web Content for Transcoding; Jul. 10, 1999; pp. 1–14.

Article—BBC Education Betsie Site; Betsie Technical Outline; About Betsie; Betsie Home Page; Betsie News Page; Betsie Download Page; Betsie Feedback Page; Dec. 17, 2009; 14 Pgs.

BBC News World Edition—Betsie Brings Web to the Blind; Jan. 18, 1999; pp. 1–3.

BBC Education Betsie Site; Betsie Technical Outline; About Betsie: Miscellaneous Computer Printouts; Jan. 21, 2009; 32 Pgs.

Bickmore, T., et al.; Digestor: Device–Independent Access to the World Wide Web; Mar. 24, 2000; pp. 1–10.

Bickmore, T., et al.; Digestor: Device–Independent Access to the World Wide Web—Computer Networks and ISDN Systems 29; 1997; pp. 1075–1082.

ForeFront—WebWhacker User's Guide; 1995–1996; 146 Pages.

Gessler, S., et al.; PDAs as Mobile WWW Browsers; 10 Pgs.

Buyukkokten, O., et al.; Power Browser: Efficient Web Browsing for PDAs; 8 Pgs.

Article—Unwired Planet; 1997; pp. 1–10.

Schiesel, S.; New York Times—Business: New Palm Pilot Links to Internet Wirelessly; May 20, 1999; pp. 1–2.

Handbook for the Palm VII Organizer; 294 Pgs.

Palm VII Handheld Technology—Wireless Internet Access Comes to the Palm Computing Platform; 1998; pp. 1–14.

Palm VII Development; Palm Computing Platform Development Zone; Nov. 30, 2009; pp. 1–3.

Tam, S. Y.; ChannelWeb—Palm VII: Internet in the Palm of Your Hand; Jul. 20, 1999; pp. 1–5.

Gibbs, M., Network Fusion—Putting Wireless Network Power in the Palm; Nov. 30, 2009; pp. 1–2.

Elgort, B.; Building Wireless Applications—Developing a Palm VII PQA that Reads Data from a Domino Database; 1998–2009; pp. 1–2.

ePQA—The e–Commerce PQA Enhancer from Stevens Creek Software; Nov. 30, 2009; pp. 1–3.

Palm–size PC User's Guide; 1999; 132 Pgs.

Craig Peacock's—Windows CE Pages (last updated Nov. 5, 1998); Nov. 30, 2009; pp. 1–2.

Craig Peacock's —Windows CE Pages (last updated May 16, 1998); Nov. 30, 2009; pp. 1–2.

www.drinkboy.com—Cocktails on the Web; Oct. 7, 2009; 1 Pg.

File History for U.S. Patent No. 6,493,758.

Hewlett Packard, HP, Jornada 420, Palm–Size PC, HP Jornada PC Companions, For the Ultimate Day's Journey; 1999; 4 Pgs.

Gewirtz, D., Computing Unplugged—Introducing the New Windows CE Power Channels; Nov. 30, 2009; 10 Pgs.

De Herrera, C.; Offline Information on Palm–Size PCs via Mobile Channels; Jan. 29, 1998; pp. 1–4.

Spring, T.; CNN.com—Palm–size CEs to go Wireless; Jun. 25, 1999; pp. 1–3.

CEBible—The Bible for your Windows CE HPC or PPCI; Dec. 8, 2009; pp. 1–2.

Hess, R.; Channels: A New Spin of the Dial; Jun. 17, 1998; 3 Pgs.

De Herrera's, C.; Chris De Herrera's Windows for CE Website; 1997,1998; pp. 1–8.

De Herrera's, C.; Chris De Herrera's Windows for CE Website; 1998; pp. 1–12.

Peacock, C.; Windows CE Clear & Simple; 1999; 15 Pgs.

File History for U.S. Patent No. 6,449,638.

Han, R., et al.; Dynamic Adaptation in an Image Transcoding Proxy for Mobile Web Browsing—IEEE Personal Communications; Dec. 1998; pp. 8–17.

Printout—MobileHTML/XML/CSS/HTTP for Mobile Web Access Matsushita Electric Industrial Co., Ltd.; 26 Pgs.

Craig Peacock's—Windows CE Palm–Size PC Pages; Jan. 13, 1999; 2 Pgs.

Printout—U.S. Bonds Rally; Jobs Report Eases Fed Rate Concern; Jun. 7, 1997; 1 Pg.
Craig Peacock's—Windows CE Palm–Size PC Pages; Dec. 1, 1998; 2 Pgs.
Printout—Spellfire—Master the Magic; Dec. 19, 1998; pp. 1–3.
Printout—Spellfire, Latest News—Wizards of the Coast to Aquire TSR Inc.; Apr. 10, 1997; pp. 1–13.
HP Jornada 420 Palm–Size PC User's Guide; 1999; 142 Pages.
Printout—Offline and Interactive Mobile Access of Internet Content; Jan. 25, 2010; 1 Pg.
Printout—Welcome to MSN Mobile—Things Every Taxpayer Should Know; Jan. 25, 2010; 1 Pg.
Microsoft News Center—MSN Takes Another Step Forward in Enabling the Everyday Web; Jan. 6, 2000; pp. 1–3.
MSN Newsroom—MSN Mobile Fact Sheet—MSN on Press Pass—MSN Mobile Fact Sheet; Feb. 2000; pp. 1–2.
Microsoft News Center—Microsoft Expedia Travel Service to Be Premier Provider of Active Channel Content for Microsoft Internet Explorer 4.0; Oct. 1, 1997; pp. 1–2.
Printout—Introducing MSN Mobile; Oct. 13, 1999; 1 Pg.
Printout—MSN Mobile—Welcome to MSN Mobile; 1999; 1Pg.
Microsoft News Center—Microsoft Launches MSN Mobile on MSN.com to Deliver Wireless Content to Cellular Phones, Handheld Devices and Pagers; Jun. 14, 1999; pp. 1–2.
Printout—Public Catalog; Nov. 25, 1997; 1 Pg.
Printout—JP Systems, Inc.—Seek Infinite Possibilities—JP Systems Unveils "NetCradle"; Mar. 19, 2010; pp. 1–2.
Printout—Pen Computing Magazine Mobile Channel Sign–Up Page; 1995–1998; 1 Pg.
Printout—CBS Sportsline; Jan. 27, 2010; pp. 1–3.
CBS Sportsline—Active Channels—CBS SportsLine Announces Its Active Channel Content for Internet Explorer 4.0; Jan. 27, 2010; pp. 1–4.
Poor, A.; Access My Library—Put Windows CE in the Palm of Your Hand; Nov. 1, 1998; 2 Pgs.
Gibbs, M.; Network World Fusion—Putting Wireless Network Power in the Palm; Sep. 6, 1999; pp. 1–3.
Elgort, B.; Computing Unplugged—Developing a Palm VII PQA that Reads Data from a Domino Database; Apr. 15, 2010; pp. 1–7.
Purcell, L.; Web Developer.com Guide to Creating Web Channels; Mar. 15, 2010; 1 Pg.
Access My Library—First Commerce Bank Leads WebTV Banking; Jun. 6, 1997; pp. 1–2.
Spyglass Device Mosaic 3.2—Detailed Information; 2000; pp. 1–4.
Spyglass Ships Prism 2.2 Internet Content Delivery Platform; Feb. 8, 1999; pp. 1–3.
Spyglass—Making Interactive Television Work with the Web; Jan. 6, 2010; pp. 1–3.
Spyglass Prism 2.2—Key Benefits and Features; 2000; pp. 1–2.
Printout—Allgame—Game.com; 2010; 1 Pg.
Printout—AvantGo Welcome; Feb. 5, 1998; 1 Pg.
Printout—AvantGo—The Internet on Your Handheld; 2000; 1 Pg.
Printout—AvantGo—Why Should I Sign Up?; Apr. 6, 2010; pp. 1–2.
Printout—AvantGo Releases AvantGo 2.0—The Definitive Enterprise Solution for Managing Mobile Information; Business Wire; Sep. 21, 1998; pp. 1–3.
Printout—AvantGo Connects New Microsoft Windows CE, Handheld PC Professional Edition Software to Enterpise Data; Buisiness Wire; Oct. 8, 1998; pp. 1–3.
Printout—AvantGo Software Extends Enterprise Applications to Handheld Devices; New Company Provides Instant Access to Essential Information for Mobile Professionals; Business Wire; Feb. 17, 1998; pp. 1–3.
Printout—AvantGo Client 2.0; Apr. 6, 2010; pp. 1–3.
Printout—AvantGo Desktop v1.1; Apr. 6, 2010; pp. 1–3.
Printout—Why Sign Up for AvantGo.com?; Apr. 6, 2010; pp. 1–3.
Bournique, D.; WAP Review—End of an Era: AvantGo Shutting Down; Jun. 4, 2009; pp. 1–7.
Business Wire; First Commerce Bank Leads WebTV Banking; Jun. 6, 1997; pp. 1–2.
Printout—B&W Photo—Game.com Internet Cartridge (Tiger); 1 Pg.
Printout—B&W Photo—Battery; 1 Pg.
Printout—B&W Photo—Game.com—Portable Gaming System with Touch Screen Technology and 5 Built–in Functions!; 1 Pg.
Printout—B&W Photo—Game.com—The Ultimate Portable Gaming System; 1 Pg.
Printout—B&W Photo—Game.com—Portable Video Gaming System with Touch Screen Technology and 5 Built–in Functions!—Model No. 71–517 (Tiger); 1 Pg.
Printout—B&W Photo—Game.com—Portable Gaming System (Tiger); 1 Pg.
Printout—B&W Photo—Game.com—Portable Gaming System (Tiger); 1 Pg.
Game.com@Everything2.com—New Year New Gear; Jan. 21, 2005; pp. 1–3.
Printout—LifeBook B142 (With Touchscreen); Feb. 5, 2010; pp. 1–7.
Business Wire—MicroTouch Ships ClearTek Touchscreen Solution for New Macintosh Computers and Monitors; Mar. 2, 1998; pp. 1–3.
The Free Library by Farlex; MicroTouch Ships Two New IBM Touchscreen Monitors; G54 and G74 Available with Choice of Capacitive or Resistive Touchscreens; Sep. 10, 1998; pp. 1–3.
MonitorMouse for OS/2 Version 2.1—Manual Version 2.1; 1992–1995; 49 Pgs.
MonitorMouse for Windows NT Version 2.0—Manual Version 2.0; 30 Pgs.
Printout—DowJones—Net Products:ICL Adds New Internet Touchscreen Browser; Oct. 1, 1997; 2 Pgs.
nFront Media—Defining Moments; Jun. 6, 1997; pp. 1–3.
Plucker—An Open Source Success Story: A History of Plucker; Apr. 6, 2010; pp. 1–8.
Tyco Electronics; MonitorMouse for Windows 95 Release 2.0; Jul. 6, 1998; 1 Pg.
Tyco Electronics; Release of MonitorMouse for Windows CE 2.1x Version 1.0; Mar. 26, 1999; pp. 1–2.
Tyco Electronics; New IntelliTouch Ultra RS–232 Serial Controller Now Available; Mar. 29, 1999; 1 Pg.
All Business—MicroTouch Introduces USB Touchscreen Controller for Monitor OEMs and System Integrators; Jan. 20, 1999; pp. 1–3.
Printout—Wikipedia—Touchscreen; Feb. 5, 2010; pp. 1–10.
Tyco Electronics—Product Updates; 1996–2010; 2 Pgs.

Printout—TV Guide Online Remote; 1 Pg.

Perlow, J.; Computing Unplugged Magazine—Using the AvantGo Server 2.11; Apr. 6, 2010; 6 Pgs.

Printout—Wikipedia—Wiki: Game.com; Feb. 5, 2010; pp. 1–7.

Printout—Wikipedia—Game.com; Feb. 5, 2010; pp. 1–5.

Printout—B&W Photos (Misc.)—Game.com—Portable Video Gaming System with Touch Screen Technology and 5 Built–in Functions!—Model No. 71–517 (Tiger); 45 Pgs.

Mohan, R., et al.; Adapting Multimedia Internet Content for Universal Access—IEEE Transactions on Multimedia, vol. 1, No. 1; Mar. 1999; pp. 104–114.

Smith, J. R., et al.; Content–Based Transcoding of Images in the Internet; 1998; pp. 7–11.

Cheung, S. L., Multimedia Content Description in the Infopyramid; 4 Pgs.

Mohan, R., et al.; Multimedia Content Customization for Universal Access; Nov. 1998; pp. 410–418.

Smith, J., et al.; Transcoding Internet Content for Heterogeneous Client Devices; May 1998; 4 Pgs.

De Herrera, C., Chris De Herrera's Windows CE Website—Offline Information on Palm–Size PCs via Mobile Channels; Jun. 29, 1998; pp. 1–3.

Microsoft Windows CE—Palm–Size PC User's Guide; 148 Pgs.

Purcell, L.; Mecklermedia—Web Developer.com; Guide to Creating Web Channels; 414 Pgs.

Simon, J. L.; Windows CE 2 for Dummies (Quick Reference)—A Reference for the Rest of Us!; 362 Pgs.

De Herrera, C.; Chris De Herrera's Windows CE Website—Windows CE 2.0 Handheld PC Pictures; 1997,1998; pp. 1–9.

Wired News—The Wired News Week; Feb. 18, 2010; pp. 1–4.

Printout—MSNBC Cover Page; Mar. 2, 2010; pp. 1–3.

Printout—Welcome to Netscape—Netcenter; Mar. 18, 2010; 1 Pg.

Printout (About:blank)—pp. 1–16.

Printout—MSNBC Cover; Feb. 26, 2010; 1 Pg.

HP Jornada 430/430se Palm–Size PC User's Guide; 1999; 145 Pgs.

Simpson, A., MSITStore: Official Internet Explorer Site Builder Toolkit; 1997; 69 Pgs.

Printout—Welcome to MSN.com; 1996; 1 Pg.

Fox, A., et al.; Adapting to Network and Client Variability via On–Demand Distillation; Oct. 1996; pp. 160–170.

Fox, A., et al.; Adapting to Network and Client Variation Using Active Proxies: Lessons and Perspectives; pp. 1–14.

Fox, A; Experience with Top Gun Wingman: A Proxy–Based Graphical Web Browser for the 3Com PalmPilot; pp. 407–424.

Fox, A; Reducing WWW Latency and Bandwidth Requirements by Real–Time Distillation—Computer Networks and ISDN Systems 28 (1996); pp. 1445–1456.

Mohan, R.; Text–Based Search of TV News Stories; pp. 2–13.

Wirbel, L; Alliance to Spin a Wireless Web (AT&T Wireless Data, Mitsubishi Wireless Communications, Pacific Communication Sciences and Unwired Planet) (Company Business and Marketing); 1996; 3 Pgs.

Unwired Planet; AT&T Selects Geosystems Global Corp.'s Mapquest to Deliver Driving Directions for AT&T Pocket-Net Directions; Oct. 6, 1997; pp. 1–3.

Unwired Planet: Device Manufacturers; Apr. 22, 2010; pp. 1–2.

Lie, H., et al.; Using XSL and CSS Together; Sep. 11, 1998; pp. 1–9.

Bray, T., et al.; Extensible Markup Language (XML) 1.0; Feb. 10, 1998; pp. 1–28.

Peacock, C.; Computing Unplugged; Create Your Own Windows CE Mobile Channel; Apr. 28, 2010; pp. 1–8.

Microsoft Windows 98 Resource Kit—The Professional's Companion to Windows 98; Chapter 6; 1998; pp. 257–301.

Norton, P., et al.; Complete Guide to Windows NT Workstation 4; 1999 Edition; Chapter 2; pp. 24–73.

Simpson, A.; Official Microsoft Internet Explorer 4 Site Builder Toolkit; 1998; pp. 5–644.

Wallace, N.; Active Desktop Programming Using Windows 98; Chapter 2; 1999; pp. 21–72.

O'Hara, R.; Microsoft Windows CE for the Handheld PC; 1997; 9 Pgs.

Simon, J. L.; Windows CE2 for Dummies Quick Reference; 1997; 10 Pgs.

Spyglass Device Mosaic 3.2 User's Guide; Mar. 1999; pp. 1–22.

Microsoft Windows CE Palm PC User's Guide; 1998; 148 Pgs.

Microsoft Windows Palm–size PC User's Guide; pp. 82–86.

Spyglass' Prism Software Speeds Data Downloads. (Spyglass Inc.)(Brief Article)(Product Announcement)—PC Week 14.40 (1997); 1 Pg.

Radosevich, L.; SpyGlass Readies Web Tools. (SpyGlass's Device Mosaic for NC's MicroServer, Prism Shown at Spring '97 Internet World)(Product Announcement)(Brief Article); 1997; 1 Pg.

AvantGo Client v1.1; Apr. 21, 1999; pp. 1–3.

W3C—W3C Working Draft; Reformulating HTML in XML; 17 Pgs.; Dec. 5, 1998.

WAP Architecture—Wireless Application Protocol Architecture Specification; pp. 1–20; Apr. 30, 1998.

UP.LINK Developer's Guide, Version 1.0; pp. 1–46; Jul. 1996.

Japanese Article w/English Translation and Verification: Toshiaki Sugiyama; Nikkei Business; Data Communication Using a Cellular Phone Metamorphosis from "Speaking" to "Reading" Powerful for Increasing Work Efficiency; pp. 73–76; May 17, 1999.

WMLScript Specification; Wireless Application Protocol WMLScript Language Specification; pp. 1–113; Apr. 30, 1998.

WMLScript Standard Libraries Specification; Wireless Application Protocol WMLScript Standard Libraries Specification; pp. 1–42; Apr. 30, 1998.

WAP WSP; Wireless Application Protocol Wireless Session Protocol Specification; pp. 1–95; Apr. 30, 1998.

WAP WTA; Wireless Application Protocol Wireless Telephony Application Specification (Draft Version); pp. 1–31; Apr. 30, 1998.

WAP WTAI; Wireless Application Protocol Wireless Telephony Application Interface Specification; pp. 1–29; Apr. 30, 1998.

WAP WTAI (GSM); Wireless Application Protocol Wireless Telephony Application Interface Specification—GSM Specific Addendum; pp. 1–12; Apr. 30, 1998.

WAP WTAI (IS–136); Wireless Application Protocol Wireless Telephony Application Interface Specification—IS–136 Specific Addendum; pp. 1–9; Apr. 30, 1998.

WAP WTAI (PDC); Wireless Application Protocol Wireless Telephony Application Interface Specification—PDC Specific Addendum; pp. 1–12; Apr. 30, 1998.

WAP WTLS; Wireless Application Protocol Wireless Transport Layer Security Specification; pp. 1–85; Apr. 30, 1998.

WAP WTP; Wireless Application Protocol Wireless Transaction Protocol Specification; pp. 1–71; Apr. 30, 1998.

W3C; Compact HTML for Small Information Appliances; 19 Pgs.; Feb. 9, 1998.

WAP WAE; Wireless Application Protocol Wireless Application Environment Overview; pp. 1–26; Apr. 30, 1998.

HDML 2.0 Language Reference—Version 2.0 (Unwired Planet); pp. 1–56; Jul. 1997.

Japanese Article w/English Translation and Verification: Seikai Yasui, et al.; Nikkei Communications; Internet that Fits in the Palm of Your Hand; pp. 98–103; Mar. 1, 1999.

W3C; Cascading Style Sheets, level 2 CSS2 Specification (pp. 1–11); 2 Introduction to CSS2 (pp. 1–9); 5 Selectors (pp. 1–18); 7 Media Types (pp. 1–4); 9 Visual Formatting Model (pp. 1–33); 17 Tables (pp. 1–29); User Interface (pp. 1–6) May 12, 1998.

WAP WAE Specification; Wireless Application Protocol Wireless Application Environment Specification; pp. 1–19; Apr. 30, 1998.

Using the UP Browser—Version 1.0.1 (Unwired Planet); 18 Pgs.; Aug. 1996.

Japanese Article w/English Translation and Verification: Nikkei Communications; Report—Mobile Phone Battle Over Text Information; Mobile Communication Internet Mail; i–mode Has Abundant Content WAP's Strength is Managing Personal Information; pp. 54–56; Apr. 5, 1999.

WC3; HTML 4.0 Specification; 1 About the HTML 4.0 Specification (pp. 1–4); 2 Introduction to HTML 4.0 (pp. 1–6); 6 Basic HTML Data Types (pp. 1–9); 7 The Global Structure of an HTML Document (pp. 1–15); 10 Lists (pp. 1–7); 11 Tables (pp. 1–31); 14 Style Sheets (pp. 1–10); 16 Frames (pp. 1–13); 17 Forms (pp. 1–28); Apr. 24, 1998.

WAP over GSM USSD; Wireless Application Protocol WAP over GSM USSD Specification; pp. 1–44; Apr. 30, 1998.

UP.SDK Getting Started Guide—Version 3.1 for HDML (Unwired Planet); pp. 1–32; Jan. 1999.

Japanese Article w/English Translation and Verification: Nikkei Electronics; Keitai [Mobile Phones] Change From Phones Into Information Devices; pp. 124–126; Mar. 22, 1999.

Chapter 3: Language Elements; pp. 1–16; Feb. 17, 2009.

WC3; Handheld Device Markup Language Specification; 2 Pgs.; May 9, 1997.

WAP Binary XML Content Format; Wireless Application Protocol Binary XML Content Format Specification; pp. 1–20; Apr. 30, 1998.

Japanese Article w/English Translation and Verification: Nikkei Electronics; Take Email in Hand and Gulp Down the Internet Too; pp. 127–132 (No. 739); Mar. 22, 1999.

WAP WCMP—Version 12; Wireless Application Protocol Wireless Control Message Protocol Specification; pp. 1–20; Jun. 1998.

Japanese Article w/English Translation and Verification: Nikkei Multimedia; A New Networking Wave Filing the Streets and Covering the Home; pp. 44–49; Mar. 1999.

WAP WDP; Wireless Application Protocol Wireless Datagram Protocol Specification; pp. 1–52; Apr. 30, 1998.

Japanese Article w/English Translation and Verification: Nikkei Multimedia; Using the NTT DoCoMo "i–mode," 67 Companies Simultaneously to Start Electronic Commerce Ranging from Stock Trading to Hotel And Restaurant Reservations; p. 59; Mar. 1999.

WAP WML; Wireless Application Protocol Wireless Markup Language Specification; pp. 1–59; Apr. 30, 1998.

Japanese Article w/English Translation and Verification: Nikkei Multimedia; pp. 60–65; Mar. 1999.

Japanese Article w/English Translation and Verification: DOCOMO Tsushin, Publication No. vol. 1—No. 8 Period—Financial Special Issue (Apr. 1, 1998–Mar. 31, 1999); pp. 0–15; Jun. 1999.

Bederson; B. B., et al.; A Zooming Web Browser; To Appear in Human Factors in Web Development, Eds. Ratner, Grose, and Forsythe; 15 Pgs.; Apr. 27, 2009.

Zoomable Graphical Sketchpad—Abstract (1 Pg.); Introduction (pp 1–4); Description—pp. 1–7; Visualizations (p. 1–6); Space–Scale Diagrams (pp. 1–4); Procedural Animation (pp. 1–2); Implementation (pp. 1–7); Physics–Based Strategies for Interface Design (pp. 1–3); Future Directions (pp. 1–2); Availability (1 Pg.); Acknowledgements (1 Pg.); Reference (pp. 1–3).

Fox, D.; Published by the Waite Press Group; I Want My WebTv; 4 Pgs.; 1997.

Feinleib, D.—Microsoft Corporation; The Inside Story of Interactive TV and Microsoft WebTV for Windows; 4 Pgs; 1999.

Japanese Article w/English Translation and Verification dated Jul. 30, 2009: Table Listing Japanese Smart Phones; 6 Pgs.

Bederson, B. B., et al.; Pad++: A Zoomable Graphical Interface System; 4 Pgs.; Apr. 27, 2009.

Barnett S.; Pen Computing Magazine: Palm VII; Like its Predecessors, the Palm VII doesn't do all that a Desktop does, but it just Might do Enough; pp. 1–6; Jul. 1, 2007.

Bederson, B. B., et al.; A Zooming Web Browser; 12 Pgs.

Miller, M.; The Complete Idiot's Guide to Surfing the Internet with WebTV; 13 Pgs.; Sep. 1999.

Hill, B.; WebTV For Dummies, $2^{nd}$ Edition 1–334; 1998.

Bjork, S., et al.; West: A Web Browser for Small Terminals; 8 Pgs.

Andreessen; M.; TechVision: Innovators of the Net: Ramanathan V. Guha and RDF; pp. 1–9; Jan. 8, 1999.

Manoharan, S.; XHTML Encoding and Compression; 4 Pgs.

Color Printout—Features of "i–mode" 1; 1 pg.

Color Printout—Features of "i–mode" 3; 1 pg.

Color Printout—Features of "i–mode" 5; 1 pg.

Printout—Application Alliance Partners (1); 1 Pg.

Printout—Application Alliance Partners (2); 1 Pg.

Color Printout—4 Cell Phones (APP–EMG–3–4(b)PA002469; 1 Pg.

NTT DOCOMO—Business Model; 2 Pgs.; 2009.

Fisher, B., et al.; CZWeb: Fish–Eye Views for Visualizing the World–Wide Web; 5 Pgs.

NTT DOCOMO—Press Release Article; Internet–Compatible "i–mode" Cell Phones Captivate; 2 Pgs.; 2009.

Musciano, C., et al.; HTML The Definitive Guide—3rd Edition—Covers HTML 4.0; 5 Pgs.; Oct. 1998.

Wikipedia Printout—i–mode; pp. 1–4; Jul. 28, 2009.

NTT DOCOMO—Press Release Article; NTT DOCOMO to Launch "i–mode" Service, Market New Cell Phone; 2 Pgs.; 2009.

Holmquist, L. E., et al.; Conference Abstracts and Applications; A Hierarchical Focus & Context Method for Image Browsing; p. 282; 1997.

Storer, J. A., et al.; Journal of the Association for Computing Machinery, Data Compression via Textual Substitution; vol. 29, No. 4, pp. 928–951; Oct. 1982.

Cooper, I., et al.; PDA Web Browsers: Implementation Issues; pp. 1–12; Nov. 9, 1995.

LookSmart; Sprint Brings the Power of the Wireless Internet to the Palm of Your Hand with the Introduction of the Sprint PCS Wireless Web—Company Business and Marketing; 4 Pgs.; 1999/2000.

Bradley, N.; The Concise <SGML> Companion; 6 Pgs; 1996/1997.

NTT DOCOMO—Press Release Article; The Number of Subscribers to "i–mode," a Mobile Communications Service with Internet Capabilities, Exceeds 1 Million; 2 Pgs.; 2009.

Bier, E. A. et al.: Computer Graphics Annual Conference Series, ACM 1993, Toolglass and Majic Lenses: The See Through Interface: pp. 73–80; 1993.

Bartlett, J. F., WRL Technical Note TN–46; Experience with a Wireless World Wide Web Client; 17 Pgs.; Mar. 1995.

Provisional Application Specification and Filing Papers for U.S. Appl. No.60/160,801, filed Oct. 21, 1999; 23 Pgs.

Provisional Application Specification Specification and Filing Papers for U.S. Apppl. No. 60/115,951, filed Jan. 14, 1999; 122 Pgs.

WAP WMLSript Addendum—Wireless Application Protocol WMLScript Statement of Intent; pp. 1–2; Apr. 30, 1998.

W3C, "Reformulating HTML in XML," http://www.w3.org/TR/1998/WD–html–in–xml–19981205/, Dec. 5, 1998.

W3C, "HTML 4.0 Specification," http://www.w3.org/TR/1998/REC–html40–19980424/html40.txt, Apr. 24, 1998.

W3C, "Cascading Style Sheets, level 2 CSS2 Specification," http://www.w3.org/TR/1998/REC–CSS2–19980512/, May 12, 1998.

Wireless Application Protocol—Wireless Markup Language Specification Version 30, Apr. 1998.

Wireless Application Protocol—Wireless Application Environment Overview Version 30, Apr. 1998.

Wireless Application Protocol Architecture Specification Version 30, Apr. 1998.

Unwired Planet, Incorporated, "HDML 2.0 Language Reference," Version 2.0, Redwood Shores, CA, Jul. 1997.

Unwired Planet, Incorporated, UP.SDK Getting Started Guide, Version 3.1 for HDML, Redwood City, CA, Jan. 1999.

Unwired Planet, Incorporated, Using the UP.Browser, Version 1.0.1, Redwood Shores, CA, Aug. 1996.

US 7,441,196 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 9, 25 and 58 are determined to be patentable as amended.

Claims 2-8, 10-24, 26-57 and 59-76, dependent on an amended claim, are determined to be patentable.

1. A method of navigating the Internet, comprising:
   displaying on-line content accessed via the Internet, the on-line content reformatted from a webpage in a hypertext markup language (HTML) format into an extensible markup language (XML) format to generate a sister site, the sister site including a portion or a whole of content of the web page reformatted to be displayed and navigable through a simplified navigation interface on any one of a television, web appliance, console device, handheld device, wireless device or cellular phone, the simplified navigation interface displayed in a form of a two-dimensional layer of cells from a plurality of layers and a plurality of cells, the two-dimensional layer in a form of a navigation matrix, each cell is a division of a screen and exclusive to a separate single navigation option associated with a specific unique input, the on-line content formatted to be displayed in one or more of the plurality of cells and formatted to be selected for navigation by one or more of the unique inputs, navigation options to change between layers of the simplified navigation interface from general to more specific in each deeper layer;
   *displaying a hyperlink on the sister site to navigate to the web page, or displaying a hyperlink on the web page to navigate to the sister site;*
   receiving a user selection of one of the navigation options;
   forwarding the selected navigation option across the internet to a server providing the simplified navigation interface;
   receiving a next deeper navigation layer of the simplified navigation interface corresponding to the selected navigation option; and
   manipulating a region of the screen for viewing and zooming and/or scrolling of the displayed on-line content.

9. A method comprising:
   displaying a first advertisement, the displaying of the first advertisement being via an internet and through a simplified navigation interface, the simplified navigation interface presenting advertisements and content through a plurality of layers and a plurality of cells, the simplified navigation interface displayed in a form of a two-dimensional layer of cells from the plurality of layers and the plurality of cells, the two-dimensional layer in a form of a navigation matrix, each cell in the navigation matrix associated with a specific unique input, each cell is a division of a screen and exclusive to a separate single navigation option, the first advertisement formatted for display in one of the plurality of cells and formatted to be selected for navigation by one of the unique inputs, navigation options to change between layers of the simplified navigation interface from general to more specific in each deeper layer;
   displaying a first content via the internet and through the simplified navigation interface, the first content displayed in one or more of the plurality of cells, the first content reformatted from a web page in a hypertext markup language (HTML) format into an extensible markup language (XML) format to generate a sister site to be displayed and navigable through the simplified navigation interface, the sister site including a portion or a whole of content of the web page reformatted to be navigable by unique inputs through the simplified navigation interface on any one of a television, web appliance, console device, handheld device, wireless device or cellular phone;
   *displaying a hyperlink on the sister site to navigate to the web page, or displaying a hyperlink on the web page to navigate to the sister site;*
   receiving a first input, the first input received as the specific unique input that is uniquely coupled with an associated cell in the navigation matrix;
   forwarding the first input across the internet to a server providing the simplified navigation interface;
   receiving a next deeper navigation layer of the simplified navigation interface in response to receiving the first input; and
   manipulating a selected region of the screen for viewing and zooming and/or scrolling of the displayed on-line content.

25. A machine readable medium having instructions stored therein, which when executed cause a machine to perform a set of operations comprising:
    displaying a first advertisement, the displaying of the first advertisement being via an internet and through a simplified navigation interface, the simplified navigation interface presenting advertisements and content through a plurality of layers and a plurality of cells, the simplified navigation interface displayed in a form of a two-dimensional layer of cells from the plurality of layers and the plurality of cells, the two-dimensional layer in a form of a navigation matrix, each cell in the navigation matrix associated with a specific unique input, each cell is a division of a screen and exclusive to a separate single navigation option, the first advertisement formatted for display in one of the plurality of cells and formatted to be selected for navigation by one of the unique inputs, navigation options to change between layers of the simplified navigation interface from general to more specific in each deeper layer;
    displaying a first content via the internet and through the simplified navigation interface, the first content displayed in one or more of the plurality of cells, the first content reformatted from a web page in a hypertext markup language (HTML) format into an extensible markup language (XML) format to generate a sister site to be displayed and navigable through the simplified navigation interface, the sister site including a portion or a whole of content of the web page reformatted to be navigable by unique inputs through the simplified navigation interface on any one of a television, web appliance, console device, handheld device, wireless device or cellular phone;

*displaying a hyperlink on the sister site to navigate to the web page, or displaying a hyperlink on the web page to navigate to the sister site;* receiving a first input, the first input received as the specific unique input that is uniquely coupled with an associated cell in the navigation matrix;

forwarding the first input across the internet to a server providing the simplified navigation interface;

receiving a next deeper navigation layer of the simplified navigation interface in response to receiving the first input; and manipulating a selected region of the screen for viewing and zooming and/or scrolling of the displayed on-line content.

58. A machine readable medium having instructions stored therein, which when executed cause a machine to perform a set of operations comprising:

displaying on-line content accessed via the Internet, the on-line content reformatted from a webpage in a hypertext markup language (HTML) format into an extensible markup language (XML) format to generate a sister site, the sister site including a portion or a whole of content of the web page reformatted to be displayed and navigable through a simplified navigation interface on any one of a television, web appliance, console device, handheld device, wireless device or cellular phone, the simplified navigation interface displayed in a form of a two-dimensional layer of cells from a plurality of layers and a plurality of cells, the two-dimensional layer in a form of a navigation matrix, each cell is a division of a screen and exclusive to a separate single navigation option associated with a specific unique input, the on-line content formatted to be displayed in one or more of the plurality of cells and formatted to be selected for navigation by one or more of the unique inputs, navigation options to change between layers of the simplified navigation interface from general to more specific in each deeper layer;

*displaying a hyperlink on the sister site to navigate to the web page, or displaying a hyperlink on the web page to navigate to the sister site;* receiving a user selection of one of the navigation options;

forwarding the selected navigation option across the internet to a server providing the simplified navigation interface;

receiving a next deeper navigation layer of the simplified navigation interface corresponding to the selected navigation option; and manipulating a region of the screen for viewing and zooming and/or scrolling of the displayed on-line content.

* * * * *